(12) United States Patent
Gottfried

(10) Patent No.: US 7,568,004 B2
(45) Date of Patent: *Jul. 28, 2009

(54) METHOD AND SYSTEM FOR SHARING BRAND INFORMATION

(76) Inventor: Linda Gottfried, 35 Marquette Rd., Montclair, NJ (US) 07043

( * ) Notice: Subject to any disclaimer, the term of this patent is extended or adjusted under 35 U.S.C. 154(b) by 662 days.

This patent is subject to a terminal disclaimer.

(21) Appl. No.: 10/993,763

(22) Filed: Nov. 19, 2004

(65) Prior Publication Data

US 2005/0251553 A1 Nov. 10, 2005

Related U.S. Application Data

(63) Continuation-in-part of application No. 10/773,861, filed on Feb. 6, 2004, which is a continuation-in-part of application No. 10/176,437, filed on Jun. 20, 2002, now Pat. No. 6,691,155.

(51) Int. Cl.
G06F 15/16 (2006.01)
(52) U.S. Cl. .................. 709/204; 709/224; 709/246; 705/27
(58) Field of Classification Search .................. 709/204
See application file for complete search history.

(56) References Cited

U.S. PATENT DOCUMENTS

| | | | | |
|---|---|---|---|---|
| 5,347,306 A | * | 9/1994 | Nitta ........................ | 348/14.1 |
| 5,625,763 A | | 4/1997 | Cirne ........................ | 395/133 |
| 5,835,088 A | | 11/1998 | Jaaskelainen, Jr. .......... | 345/343 |
| 5,854,893 A | | 12/1998 | Ludwig et al. ......... | 395/200.34 |
| 5,880,731 A | * | 3/1999 | Liles et al. .................. | 715/758 |

(Continued)

OTHER PUBLICATIONS

M. Sohlenkamp and G. Chwelos "Integrating Communication, Cooperation, and Awareness: The DIVA Virtual Office Environment", *ACM*, Oct. 1994, 331-343.

(Continued)

*Primary Examiner*—Yves Dalencourt
*Assistant Examiner*—Michael C Lai
(74) *Attorney, Agent, or Firm*—Ernest D. Buff & Associates, LLC; Ernest D. Buff; Margaret Avre La Croix

(57) ABSTRACT

An interactive, computer network based system presents consumers with multimedia brand information via a browser-based interface called the GraffitiWall®. Consumers can use the GraffitiWall® to modify and display a sponsor's brand information in any way desired, including use of avatars. Consumer modifications are immediately communicated to the other member consumers and the advertiser/sponsor. Consumers can rate the GraffitiWall®, or portions thereof, and email the GraffitiWall®. An archive of GraffitiWalls™ is maintained by the system. Consumers participate in online focus groups, one-to-one interviews and discussions, as well as games and promotions pertaining to the brand. Interaction with consumers through focus groups, one-to-one interviews, discussions, games and promotions allows the hosting company to reinforce brand equities; speak directly to their target audience; test new and updated products and services; and encourage participation to a brand via purchases and signups by rewarding the participant with coupons, samples, gift certificates, and the like. An ongoing dialogue between business and consumer, as well as consumer-to-consumer, nurtures customer participation, loyalty and satisfaction, and builds a community housed within the company's brand.

57 Claims, 22 Drawing Sheets
(19 of 22 Drawing Sheet(s) Filed in Color)

U.S. PATENT DOCUMENTS

| | | | |
|---|---|---|---|
| 5,916,302 A | 6/1999 | Dunn et al. | 709/204 |
| 5,949,414 A | 9/1999 | Namikata et al. | 345/332 |
| 6,025,871 A | 2/2000 | Kantor et al. | 348/15 |
| 6,075,571 A | 6/2000 | Kuthyar et al. | 348/584 |
| 6,125,115 A | 9/2000 | Smits | 370/389 |
| 6,167,432 A | 12/2000 | Jiang | 709/204 |
| 6,195,091 B1 | 2/2001 | Harple et al. | 345/330 |
| 6,201,859 B1 | 3/2001 | Memhard et al. | 379/93.21 |
| 6,304,283 B1 | 10/2001 | Kitagawa | 348/14.06 |
| 6,317,777 B1* | 11/2001 | Skarbo et al. | 709/204 |
| 6,323,894 B1 | 11/2001 | Katz | 348/15 |
| 6,338,044 B1 | 1/2002 | Cook et al. | 705/14 |
| 6,351,777 B1 | 2/2002 | Simonoff | 709/250 |
| 6,490,614 B1* | 12/2002 | Shaffer et al. | 709/206 |
| 6,559,863 B1 | 5/2003 | Megiddo | 715/753 |
| 6,954,728 B1* | 10/2005 | Kusumoto et al. | 705/1 |
| 7,149,984 B1* | 12/2006 | Rock et al. | 715/838 |
| 2001/0007332 A1 | 7/2001 | Kjonaas et al. | 235/379 |
| 2001/0027410 A1 | 10/2001 | Ueda | 705/10 |
| 2001/0034664 A1 | 10/2001 | Brunson | 705/26 |
| 2001/0038033 A1 | 11/2001 | Habib | 235/375 |
| 2001/0039519 A1* | 11/2001 | Richards | 705/27 |
| 2001/0056395 A1 | 12/2001 | Khan | 705/37 |
| 2002/0072955 A1 | 6/2002 | Brock | 705/10 |
| 2002/0161764 A1* | 10/2002 | Sharo | 707/7 |
| 2004/0103148 A1* | 5/2004 | Aldrich | 709/204 |

OTHER PUBLICATIONS

D. Kirovski et al., "Hypermedi-Aided Design", *ACM*, Jun. 2001, 407-412.

* cited by examiner

METHOD AND SYSTEM FOR SHARING BRAND INFORMATION

CROSS-REFERENCE TO RELATED APPLICATIONS

This application is a Continuation-In-Part of application Ser. No. 10/773,861, filed Feb. 6, 2004 which, in turn, is a Continuation-In-Part of application Ser. No. 10/176,437, filed on Jun. 20, 2002, now U.S. Pat. No. 6,691,155, the disclosures of which are hereby incorporated in their entirety by reference thereto.

BACKGROUND OF THE INVENTION

1. Field of the Invention

The present invention relates to a web-based information sharing system; and more particularly, to a computer interface enabling companies and consumers to share brand information over the World Wide Web.

2. Description of the Prior Art

Advertising offers value to the consumer by introducing the consumer to new products, about which the consumer would not otherwise be informed. At times, these may even be essential products that substantially benefit the consumer's health, finances, and quality of life. Notably, over the past fifty years, the nature of advertising has been evolving to reflect the increasing sophistication and technological innovation characteristic of today's media. To a certain extent, today, advertising can even be characterized as an art form. Advertising has become more pervasive and the consumer's acceptance of advertising has increased.

One recent advertising development is the use of movies as a medium for brand reinforcement. For example, the popular movie, "E.T." shows a character clearly eating Hershey's Reese's Pieces®, rather than a generic chocolate candy. Characters in the movie, "The Client", reach for clearly labeled soda products to calm themselves. The movie, the "Matrix" features telephones identifiable as Nokia® brand. Consumers seem to accept this form of advertising, as adding realism to the story a movie has to tell, as long as it doesn't involve potentially harmful products such as alcohol or cigarettes. In addition, consumers gladly purchase memorabilia related to movies and television shows such as Mickey Mouse watches, E.T. dolls, and Spiderman costumes, which are in and of themselves, a form of advertising. Consumers have adopted advertisements as status goods so that the line between advertisement and product has become blurred.

Most recently, the World Wide Web (Web) has become an additional medium for brand reinforcement. However, studies show that pop-up ads and banner ads, along with unsolicited email, annoy consumers and may provide limited benefit to the advertising companies. Consumers are ready for a method of interacting creatively with brand information, particularly graphical information, over the Web and advertisers are equally anxious for the instant consumer feedback the Web can provide. Advances in software and hardware, as well as an increase in available bandwidth, now make this feasible. In addition, consumers seem to welcome using the Web as a means to share their evaluation of products whether through the form of book reviews on amazon.com or product evaluations on a wide variety of sites. The prior art describes some attempts to use the Web for sharing information.

Video conferencing was an early attempt to enable users to interact and share documents over the Web. Collaborative video conferencing software currently exists which enables individuals, located at physically dispersed locations, to view the same data over the Web and to modify it. For example, U.S. Pat. No. 6,317,777 B1 to Skarbo et al., entitled "Method for Web Based Storage and Retrieval of Documents," describes a method by which a presenter can share a file with other conference attendees and update the shared document with the changes made to the document during the conference sharing. A document server incorporates a revision control system to allow a history of the documents to be maintained on the server. The server can present a list of current document versions as well as previous versions, thereby allowing the attendees to review the document in all its previous forms.

Also known in the art are networked systems, which enable conference attendees to create or modify information and to share it over the Web. For example, attendees can draw on a whiteboard accessible to all the attendees, using standard geometric shapes such as lines and circles. The attendees can exchange not only text files but also, video, audio, and graphics files. Further, the attendees can communicate via a chat function, which is a real-time, interactive, textual based conference tool that allows attendees to post messages to each other in a shared area. Such a system is described in U.S. Pat. No. 6,195,091 B1 to Harple et al. entitled "Apparatus for Collaborative Computing."

More recently, focus groups, which are discussions that enable marketers to acquire feedback from a group of participants regarding new products, are being conducted over the Web. U.S. Pat. No. 6,256,663 to Davis entitled "System and Method for Conducting Focus Groups Using Remotely Loaded Participants Over a Computer Network" describes how a chat function can be used to implement a focus group. In the described system, the focus group members, the group moderator, and the client presenting the new product are all located remotely from each other and communicate via the Web. The focus group members can view the messages each member transmits but cannot view the messages the client and moderator transmit to each other.

Consumers are now ready for an online environment in which they can creatively express and communicate their feelings about products as members of a virtual community. Specifically, what the prior art does not provide is a computer network based system that enables the consumer to modify brand information in a way that instantly reflects the consumer's thoughts, wishes, and desires for what the brand should be, and also rewards the consumer for the consumer's efforts. Also needed is a computer network based environment for immediately communicating the consumer's input to both other consumers and the advertiser. Further needed is the ability to easily adapt this system to any brand desired.

SUMMARY OF THE INVENTION

The present invention provides a computer network based system and method whereby consumers can interact with brand information and with each other. The system contains product information that is stored in a plurality of product information servers and arranged in a multimedia element. Product information includes information that reflects brand message or brand identity of a good or service. The multimedia element includes video, animation, iconography, text, audio, and chat. The system and method provide an interactive forum where sponsors and consumers can effectively interact and communicate.

The invention is implemented over the Web, an intranet, or other network system. Consumers interact with a server, or a plurality of servers, in client server mode, using a standard browser, such as Microsoft Internet Explorer™ or Netscape Navigator™. Each consumer registers as a member and receives an identifying username (handle). Such a system can be available to the consumer twenty-four hours a day, seven days a week.

The consumer interacts with a multimedia interface known as the GraffitiWall®, which offers several different types of interaction. In Create Mode, the advertising sponsor or sponsors provide the consumer with a variety of multimedia elements such as audio files, video clips, icons, text, and photographs, which the consumer can place on a virtual Wall™, (GraffitiWall®) within a frame window, in any way the consumer desires. The elements include information pertaining to the brand, for example, a picture of a bathing suit being offered for sale or being considered for sale as a new product or lingerie that a retailer wishes to market. Products of this nature generally must be tried on before purchase and some consumers may be embarrassed to try them on in a public environment such as a store dressing room.

The networked interactive system displays product information to a plurality of consumers. The system comprises: (i) a multimedia forum for enabling the consumers to communicate in a plurality of modes with at least one sponsor associated with a brand that is related to the product information; and (ii) a multimedia interface for enabling the consumers to modify and view the product information through use of a plurality of graphic tools. The system enables the consumer to modify the product information using graphic tools, and the product information and the multimedia interface can be updated based upon the consumers' modifications and communicated to the sponsor.

A sponsor's brand is naturally connected with a brand message, a brand identity, or a brand characteristic that associates the brand with a good or service provided by the sponsor to the public. The product information utilized by the system includes information related to the specific brand message, brand identity, or brand characteristics. This product information is arranged in a multimedia element having graphic tools to enable consumers to interface therewith and modify the brand message, brand identity or brand characteristics.

Preferably, consumers and sponsors can communicate in a fun, unique way so that consumers continuously return to the sponsor's interactive display through the utilization of avatars. An avatar is an animated character, generally depicting a human; but animals and animated objects can also be utilized. The system provides an avatar kit having an array of avatar multimedia elements encompassing a plurality of palettes. Such palettes include the following: an avatar body pallet; an avatar hairstyle palette; and an avatar facial expression pallet. Both the sponsor and the consumer can create their very own avatar. A sponsor can create a customized branded avatar that acts as an interactive buddy, interacting with other avatars that are created by the same sponsor or by consumers. Consumers can create the avatar through use of the predetermined personalities and characteristics provided by the palettes. Alternatively, the sponsor could create preassembled avatars from which the consumer can choose.

The avatar kit may have an array of avatar multimedia elements comprising an avatar body pallet, an avatar clothing pallet, an avatar hairstyle palette, an avatar facial expression pallet, a personality pallet, and an audio pallet. The avatar body pallet can comprise a plurality of body types, hairstyles, heads, facial structures, faces, limbs, and personality components. Both the sponsor and the consumer can create customized avatars that act as interactive buddies having predetermined personalities. The avatar kit may be adapted for use by the sponsor in creating an avatar that is associated with the brand to form a branded avatar. The avatar kit provides predetermined avatars that have predetermined personalities and interact with the branded avatars from which the consumer can choose to form a consumer avatar. The avatar kit may also be adapted for use by the consumer in creating an avatar to form the consumer's very own personal avatar.

The avatars created by the sponsor and consumers can interact with a plurality of avatars throughout the system. Branded avatars are adapted to be used as a conduit for communication between the sponsor and the consumer. These conduits of communication may include any of the following: at least one customer service representative; at least one online DJ; at least one promotional product launch service; or at least one company branded character icon. Alternatively, the multimedia elements utilized to make up avatars may comprise a body type palette, hair styles, facial expressions, clothing, musical backgrounds, personalities, and sound bytes.

Sponsors can customize a brand environment so that the environment provides a brand forum where sponsors and consumers can chat and interact with each other. The consumer may also be able to customize the brand environment. The multimedia forum may be created by the sponsor and includes the following elements: (i) at least one public main wall frame window for displaying the product information related to the sponsor; and (ii) optionally at least one public sub-wall frame window located within the public main wall frame window. The public sub-wall displays the product information and is a scrollable sub-wall window. Both the sponsor and the consumer can access the public main wall and the public sub-wall and modify and view the public main wall and the public sub-wall. The consumer may be able to create a public sub-wall frame. Private sub-walls are also provided for by the system.

These private sub-wall frame windows are located within the public main wall frame window. The private sub-wall acts as the consumer's private apartment of sorts and can only be accessed, viewed and modified by the consumer who created it. These walls can be traversed upon by sponsor created branded avatars and consumer created consumer avatars. The avatars are seen on the public main wall, public sub-wall, and private sub-wall as animated electronic characters that interact and communicate with each other and their surrounding environments (i.e. the various walls).

Communication is provided by way of a post office communication interface, a phone a friend communication interface, or a chat communication interface. The phone a friend interface allows consumers to communicate by way of video cameras and microphones. The chat communication interface comprises textual, visual, and audio emoticons that can be utilized to reflect a plurality of emotions. The avatars can also chat through an avatar chat communication interface comprising textual, visual, and audio emoticons to reflect a plurality of emotions. The avatar chat communication interface may be a private chat between the consumer avatars. Consumers and the sponsor can create their own avatars and can select a plurality of function multimedia elements adapted to interact with the avatars via the multimedia interface of the system.

In another embodiment, the system can include a sponsor reward system that rewards consumers points based on a plurality of scaled levels. Each scaled level reflects a point system and the consumers are awarded points for participating with the sponsor. Earned points are redeemable for branded and non-branded goods and services. For example, a consumer could earn enough points to get their own private sub-wall.

A navigation interface is also provided in order to facilitate movement of the avatars/consumers throughout the wall. The navigation interface provides a compass arrow, a dynamic map, a plurality of sub-walls throughout the multimedia forum, a plurality of transportation means, and a plurality of menus. Transportation means can comprise, but are not limited to, taxis, planes comprises taxis, planes, cars, wheel chairs, scooters, and skateboards. The dynamic map can be updated in real-time accordance with the consumer and the sponsor modifications.

A list can be provided to the sponsor posting currently logged-on consumer members. The list also provides the location of the logged-on consumers and interfacing means for communicating with the logged-on consumers. An administration or communication tool set adapted to enable the sponsor to continually modify the system is provided.

The system also provides multimedia tools allowing consumers to build a sequential multimedia environment. This sequential multimedia environment includes a studio mode and a concert mode. The studio mode involves creating a multimedia layer sequence via a gridded timeline where time is represented horizontally and visual and auditory depth is represented vertically. The concert mode comprises playing the multimedia layer sequence formulated in the studio mode.

In another embodiment, the sponsor provides a wall contest that engages consumers and provides consumer information to the sponsor. The wall contest can comprise, but is not limited to, creating a multi-media postcard, story writing, multimedia painting, a best radio commercial or finding answers to a scavenger hunt. The wall contest also provides for the continuous tallying of votes for the wall contest entries to determine the winner. The winner can receive points redeemable for rewards.

In yet another embodiment there is provided a method for displaying product information to a plurality of consumers in a networked interactive system. The method comprises: (i) means for connecting the consumer with at least one sponsor associated with a brand that is related to product information concerning a brand so that they can communicate with each other in a multimedia forum; (ii) means for providing a multimedia interface to the consumer with which the consumer can modify and view the product information; (iii) means for updating the product information and the multimedia interface based upon the consumer modification; and (iv) means for communicating the updating to the sponsor. The product information can be updated based upon the consumer modification and communicated to the sponsor.

Among the significant benefits accorded by the GraffitiWall® are certain enablement and facilitation features, which allows companies to: (i) reinforce their brand equities; (ii) speak directly to their target audience on an ongoing basis; (iii) test new and updated products and services via the Focus Group/Feedback mode; (iv) create an environment, which builds greater customer satisfaction and involvement; (v) build brand communication so customers see and feel the brand as his/her own; and (vi) encourage participation to a brand via purchases and signups by rewarding folks with coupons, samples, and gift certificates.

Customers are enabled to express product preferences in a free-form mode using the Web based GraffitiWall® system, which dynamically stores customer inputs and updates the Wall for viewing by other users. An ongoing dialogue between business and consumer, as well as consumer-to-consumer, nurtures customer participation, loyalty and satisfaction, and builds a community housed within the company's brand. The end results spell greater profits and keep companies on the radar; first and foremost in the minds of their customers.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The invention will be more fully understood and further advantages will become apparent when reference is had to the following detailed description and the accompanying drawings, in which.

DESCRIPTION OF THE PREFERRED EMBODIMENTS

Figure 1:
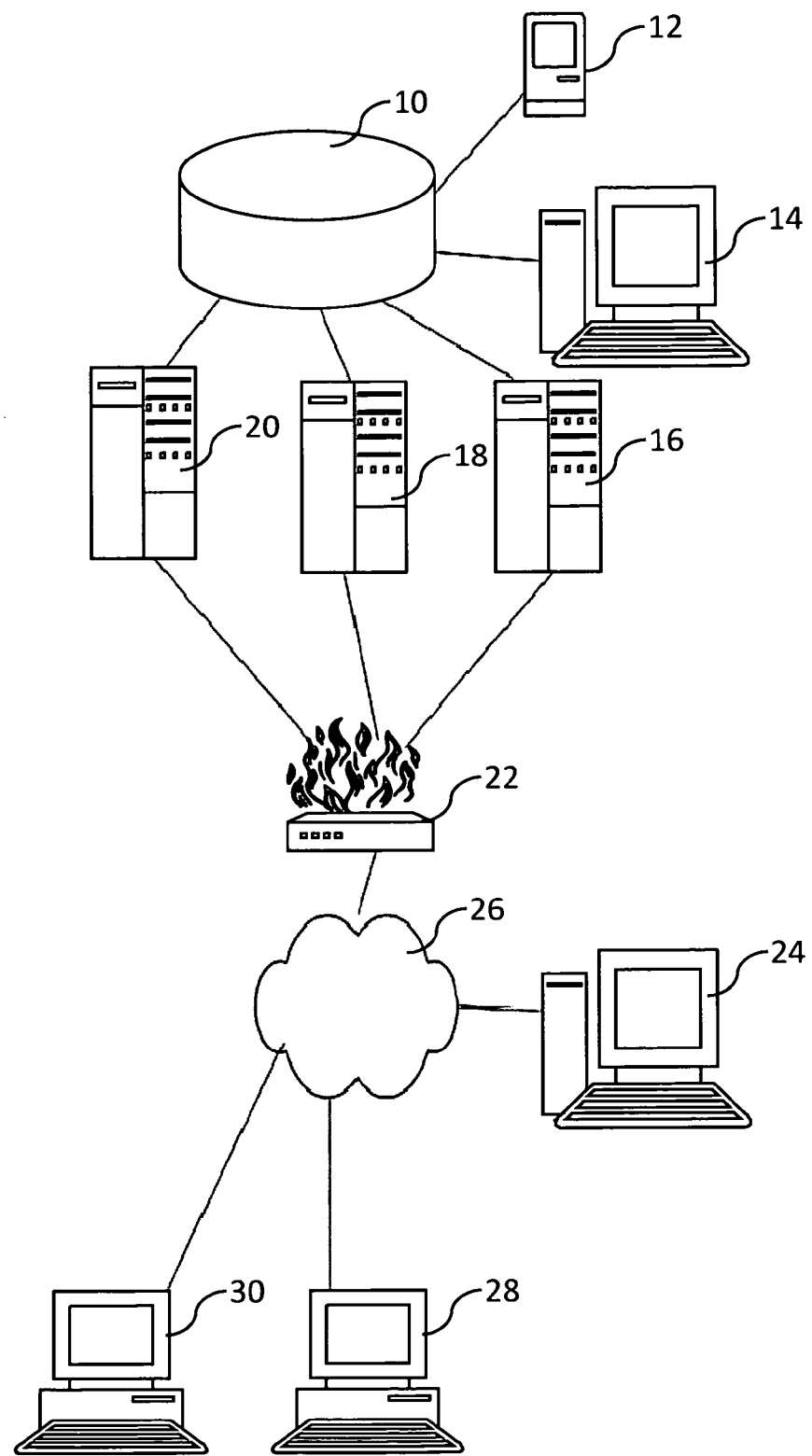
FIG. 1 is a block diagram illustrating the functional components of a system on which the present invention can be implemented.

FIG. 1 shows example hardware for the present system. The database server 10, stores the entire historical state of the GraffitiWall®, the brand information used to create the Wall, the Graffiti added by consumers, consumer demographic information, and survey and Focus Group/Feedback data provided by the consumers. Information stored in the database server 10 may take the form of tables comprising a relational database, for example. The database server 10 is connected to a plurality of product information servers 16, 18, 20. To support scaling, multiple product information servers 16, 18, 20 can serve visitors to a single GraffitiWall®. The product information servers 16, 18, 20 interact with the database server 10 on behalf of the consumer workstations 28, 30 to minimize the load on the database server 10 by caching information.

There may be any number of servers 16, 18, 20 or the servers 16, 18, 20 can be eliminated, in which case the database server 10 is directly connected to the firewall 22. There may also be more than one database server 10 and any number of consumer workstations 28, 30. The product information servers 16, 18, 20 are augmented standard Web servers and handle the following types of requests: retrieve page (standard HTML); retrieve Wall section (by area and time); add/update graffiti; return Wall snapshot; retrieve chat; send chat message; add user; validate user; update user; update user demographics; and update user survey.

The firewall 22 insulates the database server 10 from the Internet 26. The database server 10 can also be connected to a personal digital assistant (PDA) 12 or other portable device such as a cell phone or laptop. A system administration workstation 14 is connected to the database server 10 for managing the database server 10. A plurality of consumer workstations 28, 30 communicate with the database server 10 and the product information servers 16, 18, 20 via the Internet 26 and the firewall 22. A sponsor workstation 24 communicates with the database server 10 in the same manner as the consumer workstations described above. The system may also be implemented in an intranet environment as is well known in the art. Also, any consumer workstation 28, 30 can function as a kiosk connected over an intranet to the database server 10.

The consumer workstations 28, 30 use standard browser software, such as Microsoft's Internet Explorer®, to communicate with the database server 10. GraffitiWall® Visitor Software can be provided to the consumer workstations 28, 30 in the form of an ActiveX control Java Applet or Shockwave Movie, for example. Images are stored as vector graphics using Flash® or similar technologies. The GraffitiWall® Visitor Software will receive and supply data to the product information servers 16, 18, 20 using the HTML and XML over HTTP standard protocols. The GraffitiWall® Visitor Software can be run either as an Active Server Page, on behalf of sponsors, or it can be delivered to sponsors as a software product, which the sponsors can run on their own server infrastructure. The Visitor Software supports segmenting consumers into demographic or other groups, based upon information stored in the database server 10, such that the GraffitiWall® and other content displayed can be customized for specific groups and certain sections of the GraffitiWall® are visible only to members of specific groups.

Figure 2:
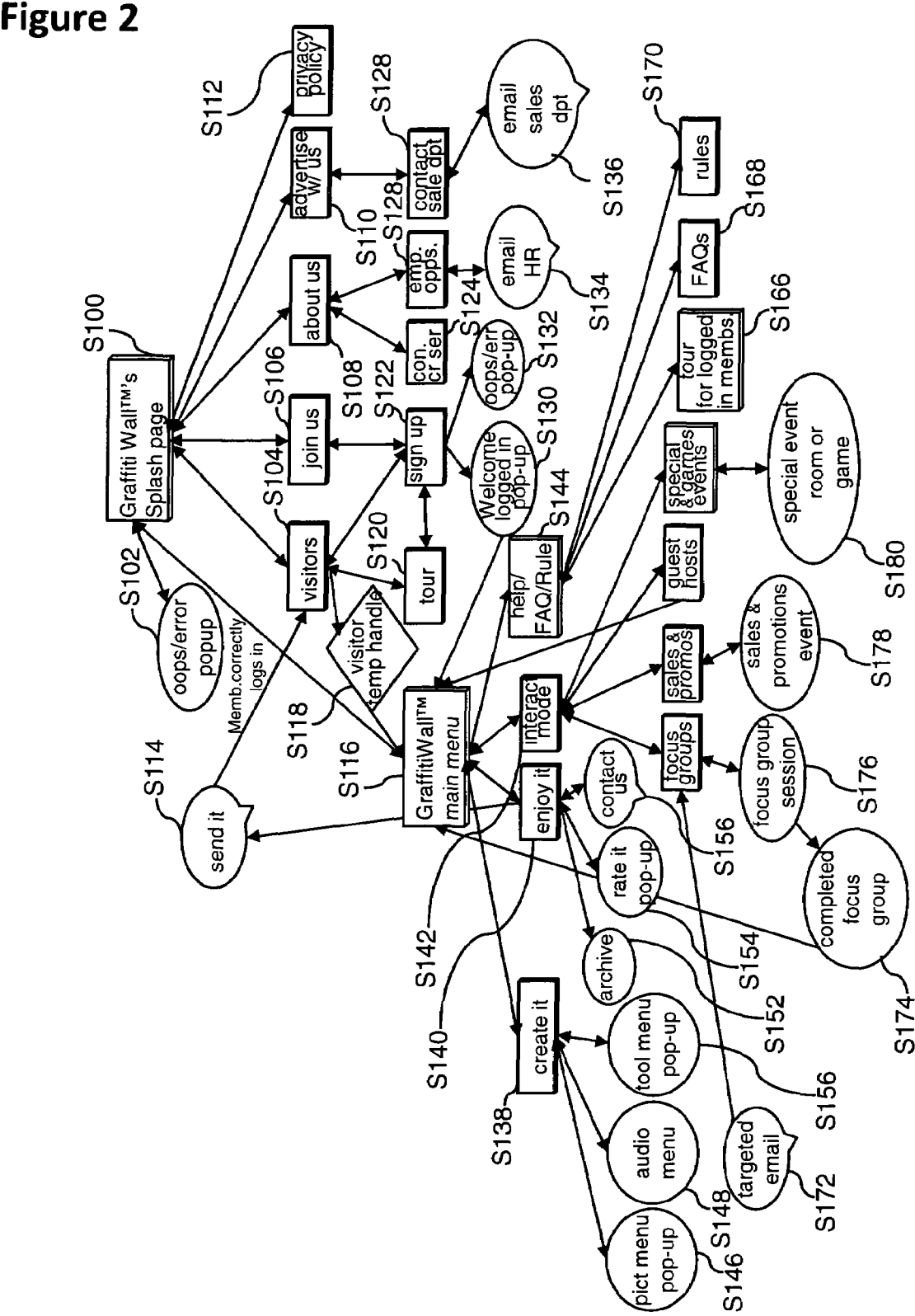
FIG. 2 is a flow diagram depicting the operation of the present invention.

Graffiti created by consumers is stored as a series of instructions, or opcodes, that manipulate the GraffitiWall®. An example of an opcode might be "color all pixels black in the first line of the Wall." The use of opcodes enables the system to display any version of the Wall, and the process of constructing it, at any time and as many times as desired. The relational database stored on the database server 10 contains a record of each media object created, its position, the user who created it, and the GraffitiWall® it was created on. Accordingly, it is not necessary to store multiple copies of the GraffitiWall®, but rather, only time stamped modifications to the Wall. The consumer can easily email a "snapshot" of the Wall, taken at any time, as the Wall history is maintained on the database server 10. The step-by-step operation of the hardware illustrated in FIG. 1 is shown in FIG. 2.

xFIG. 3 shows a flow diagram depicting the Avatar operation of the present invention. A member (consumer) can join the GraffitiWall® at 32 and registers after receiving a "welcome" email 33. After logging in on the log in wall 34, members can design their own avatar using the GraffitiWall® after entering the "Main Street Wall" screen 35. An avatar is an incarnation or embodiment in human form, usually used hyperbolically in comparisons and is a remarkably complete manifestation or embodiment of a person, a concept, philosophy, or tradition.

Figure 3:
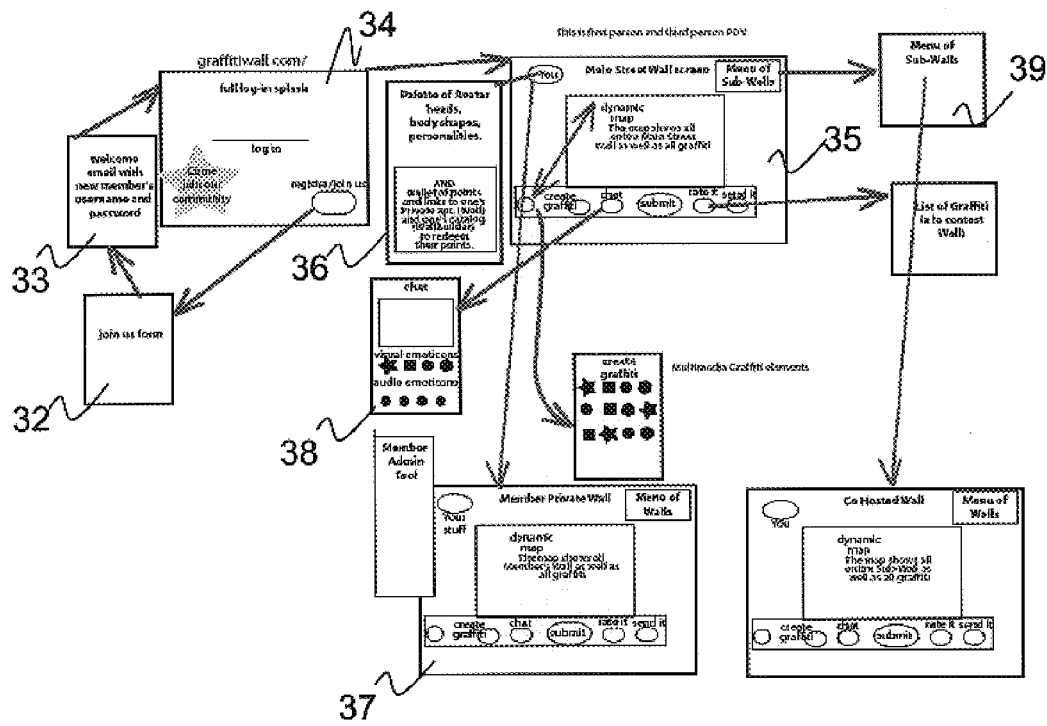
FIG. 3 is a flow diagram depicting the Avatar operation of the present invention.
Figure 9:
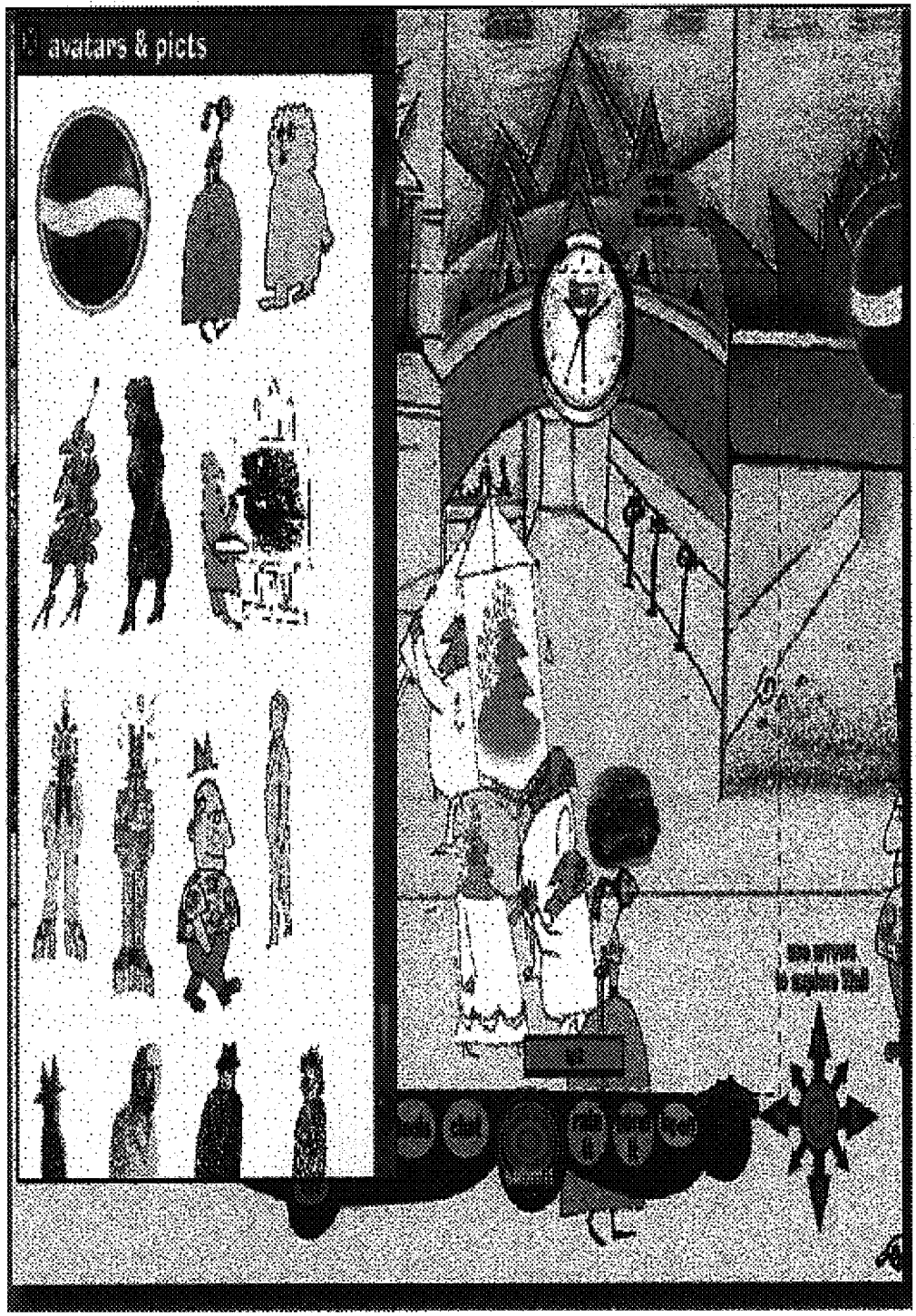
FIG. 9 is a sample screen shot showing the Select Avatar screen.
Figure 10:
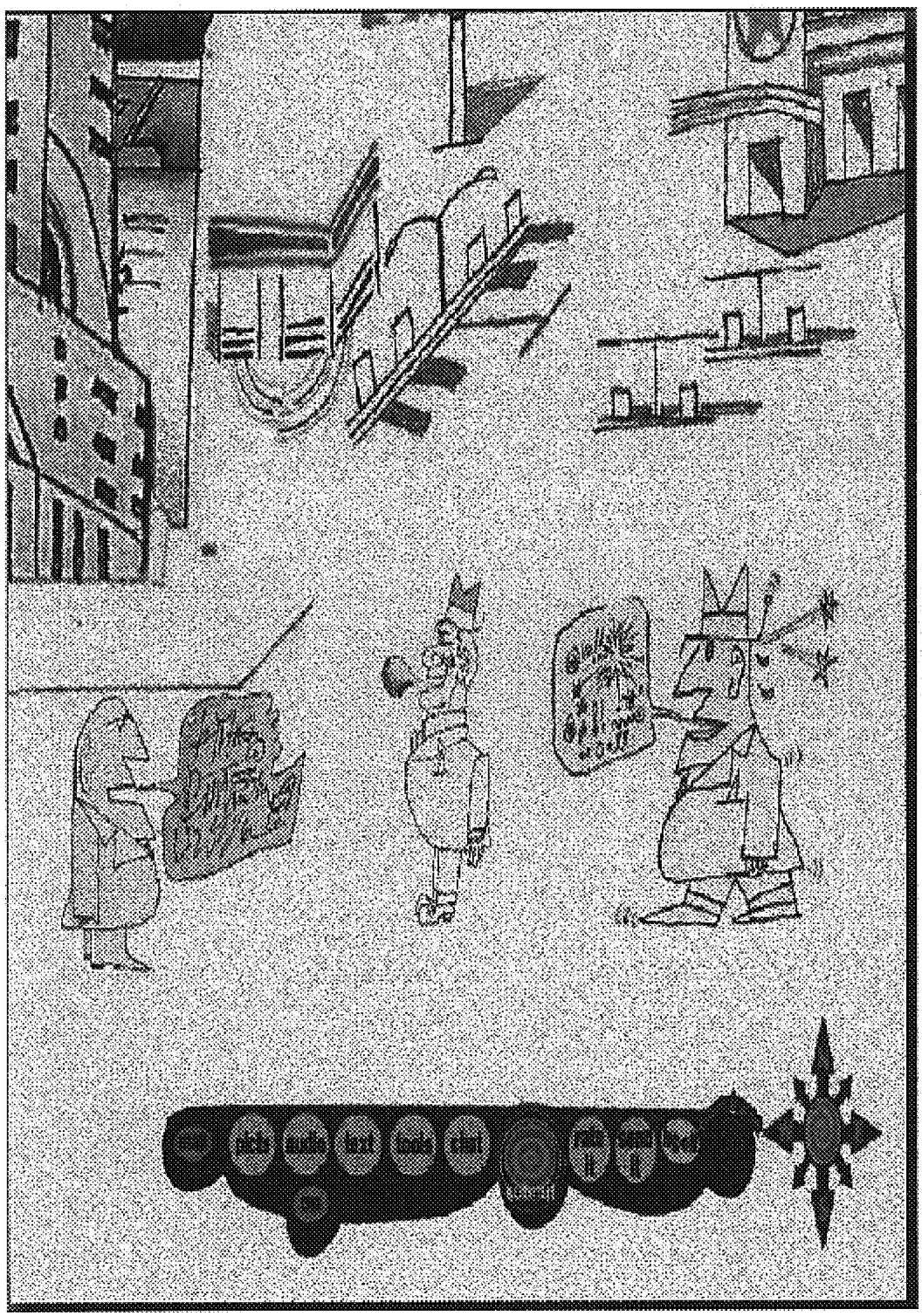
FIG. 10 is a sample screen shot showing the Chat screen.
Figure 11:
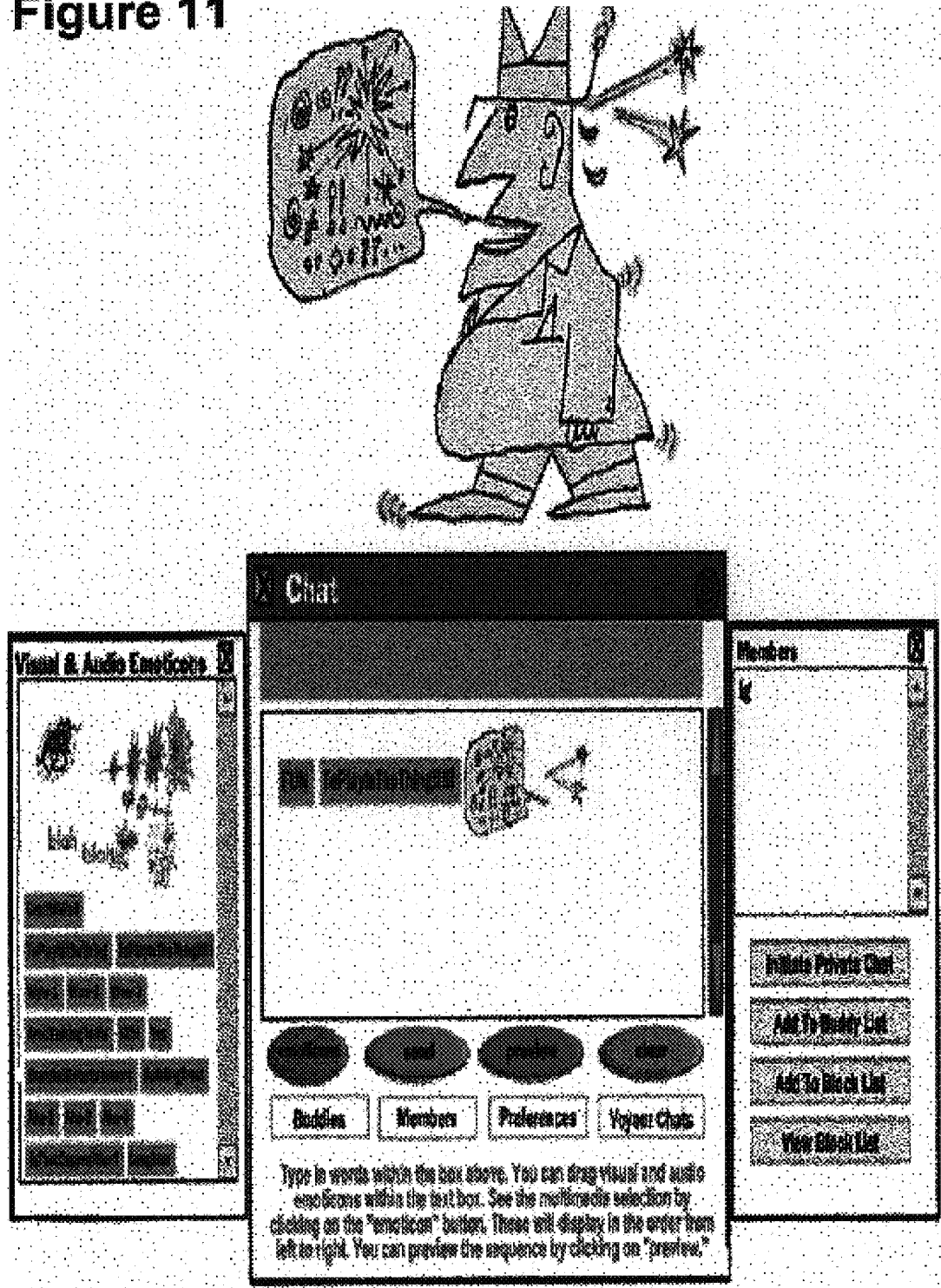
FIG. 11 is a sample screen shot showing tools to chat for use by the consumer in the Avatar Chat screen.
Figure 16:
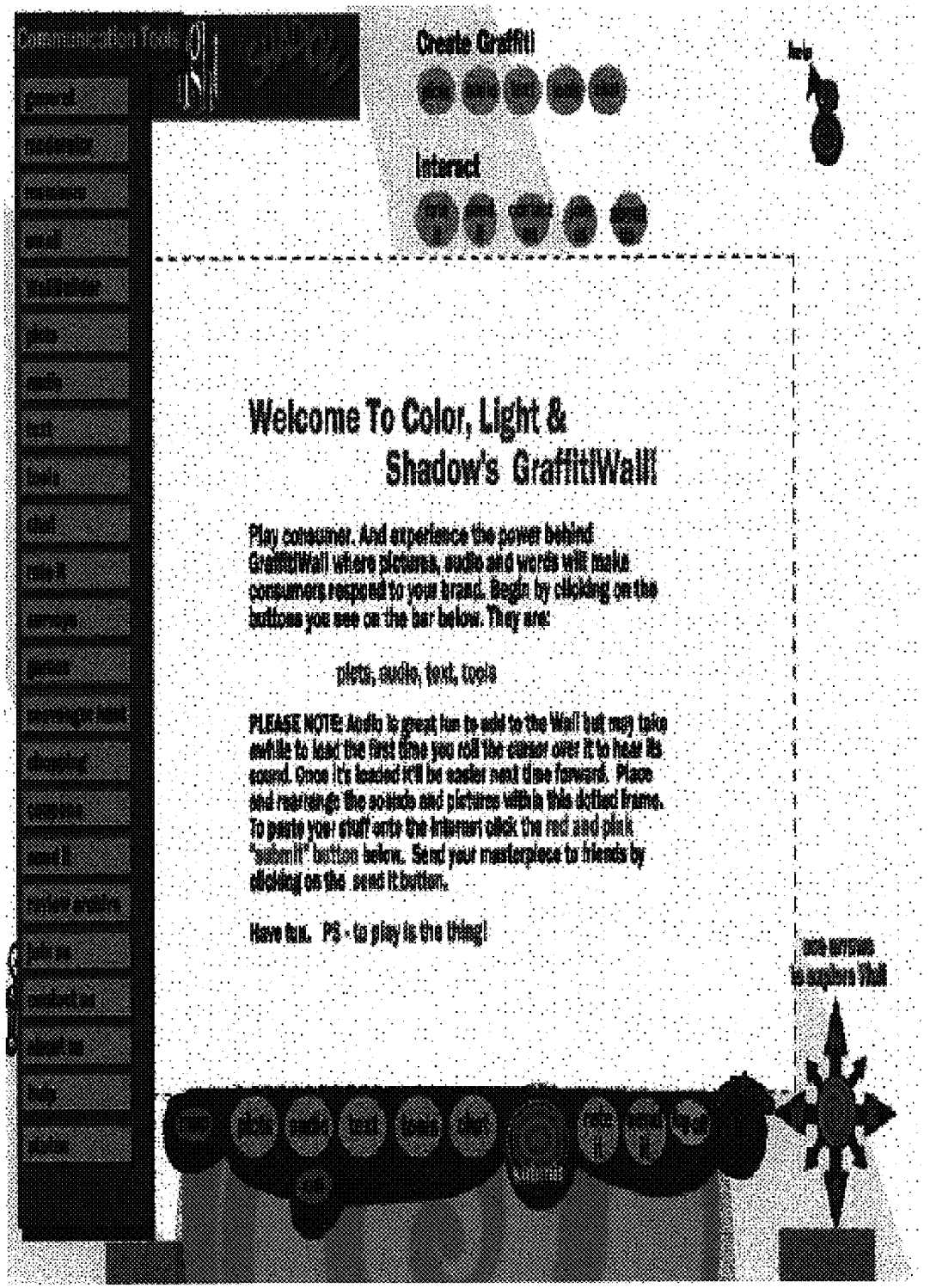
FIG. 16 is a sample screen shot showing the Communication Tools.

The Main Street Wall 35 in FIG. 3 is the main gathering place to meet, play and communicate with the entire group. The Wall allows the member to enter the company sponsored locations and activities, as well as locations designed by members. A palette of avatars is shown at 36. Selection of this feature provides members with a plurality of heads, body shapes, personalities, and the like, from which they can select to design their own unique avatar. An example screen shot is shown by FIG. 9, the Select Avatar screen. Members and Companies can design their own private walls 37. A registered member can select the "chat" tool from the Main Street Wall screen 35. Upon selection the member enters the "chat" screen 38. Sample "chat" screens are shown in FIGS. 10 and 11. A menu of Sub-Walls 39 can be selected by way of the Wall screen 35. The Sub-Walls 39 allow a member to enter a company member's Wall. The "rate it" tool on the Main Street Wall screen 35 allows a member to view member entries. The system administration workstation 14 is equipped with Administrative Control Panel (ACP), Admin Tool Set, Admin Tools or Communication Tools, illustrated by way of FIG. 16, which is browser-based. The The sponsor can create customized brand avatars in 2*d* and 3*d* that are programmed to act like interactive buddies with predetermined personalities. In addition, the sponsor (company) can allow the audience (consumers) to build their own avatar. Avatars with predetermined personalities can be used by the company to communicate their product information and act as communication conduits. For example, avatars can be used as customer service representatives, online DJs, promotional models, and company branded characters, iconography and trademarks. Customer service representative avatars can be specially designed characters evoking the company's style and can be utilized to optimally bridge the Company with consumers. Online DJs can have as diverse and defined personalities as TV or Radio personalities depending on the attractiveness of a given personality to a specific demographic. These personalities can be scheduled to be viewed at certain times so that Wall members could log on when specific avatars are scheduled. Promotional model avatars can be built specially for new product and service launches. Company branded characters, iconography, and trademarks can play and communicate with the avatar characters.

Consumers can construct their own avatars using an array of multimedia elements. For example, a consumer could upload a picture of her face and a picture of her body, which would be added to the personality of one of the Victoria Secret® super models. From there the consumer's self-styled avatar could try on Victoria Secret® bathing suits. Members can interact with this model as an animated paper doll to decorate the VS decorated Wall, or as an interactive chat buddy. Alternatively, the Company (in this case Victoria Secret) can use these models as a way to test out new concepts, clotheslines and commercials via interactive focus groups. The Company may allow their audience the ability to upload their own multimedia elements to further customize the avatar. For example, a consumer could upload a picture of his face, which would be added to the body and personality of one of the Victoria Secret's super models.

Avatars within a brand-saturated environment can be created by the host company. In this embodiment users can chat and interact with the host company by way of the 2D & 3D branded avatars. Alternatively, the users can chat and interact with other users and the host company's brand avatars.

Figure 5:
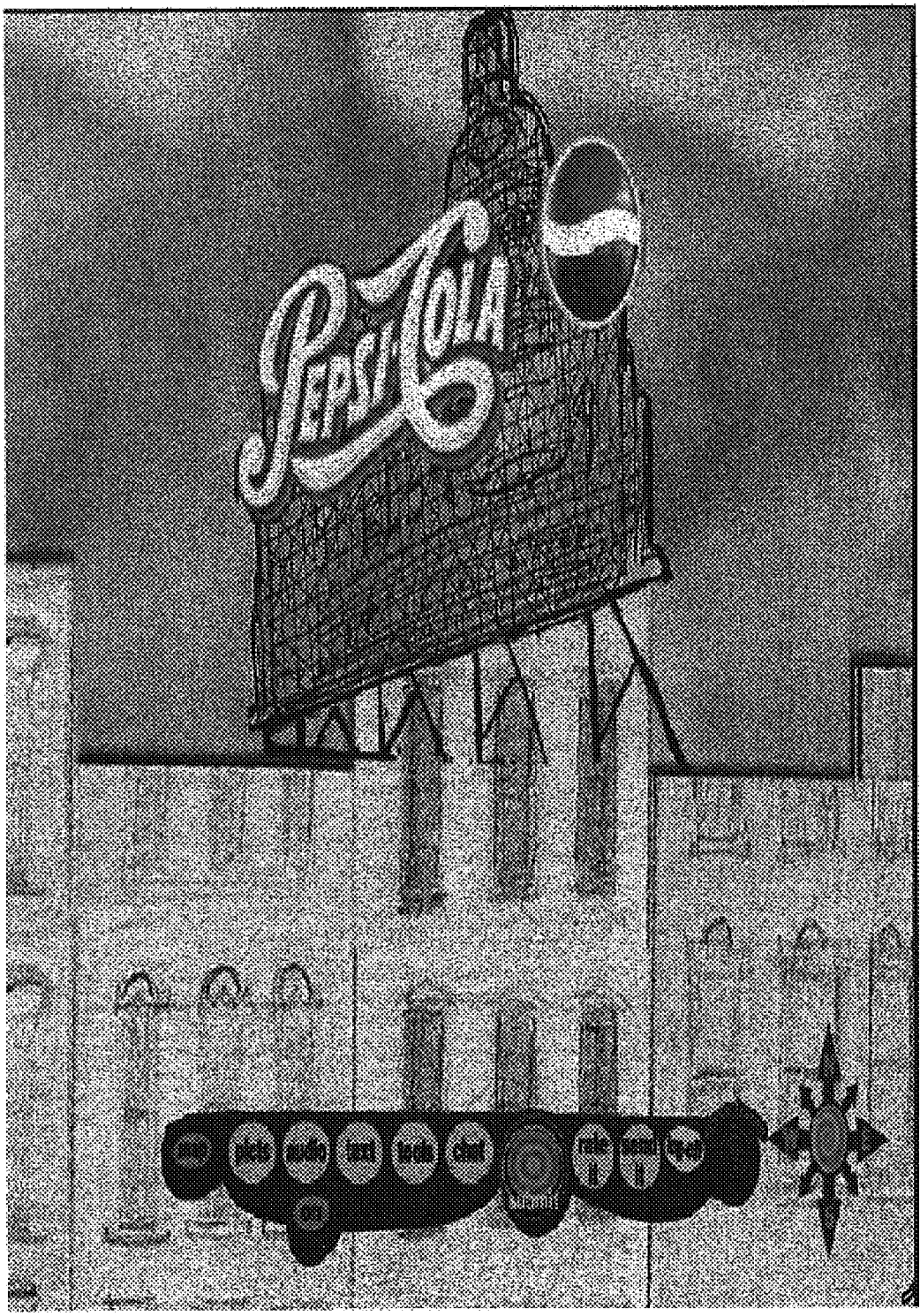
FIG. 5 is a sample screen shot showing a screen of the Brand Environ from which a consumer can use to contact a Wall™ sponsor.
Figure 6:
FIG. 6 is a sample screen shot showing a Sponsor Private Wall.

Avatars within both Public and Private Branded Walls are located throughout the GraffitiWall™, as shown by way of the Avatar flow chart illustrated in FIG. 3. The Main Wall 35 can be a 3D or 2D environment where users can interact with the brand avatars and navigate throughout the Wall. There are hotspots throughout the Main Wall that contain sub-walls. When the user selects these hotspots the user is transported into the given sub-wall. For example, the Main Wall 35 could be designed by the Company as a cityscape screen, as in sample screen shots shown in FIG. 4 and FIG. 5. Sub-Walls can be contained within the Main Wall 35 and can include of a variety of environments such as a test kitchen, nightclub, café, town hall, theater, or dinner party. A sample screen shot showing the sub-wall as a dinner party is illustrated in FIG. 6. These sub-walls are fully functioning GraffitiWall® that can be accessed through the Main Menu Wall 35 (screen samples shown in FIGS. 4 and 5) and can be accessed by a unique URL.

Figure 7:
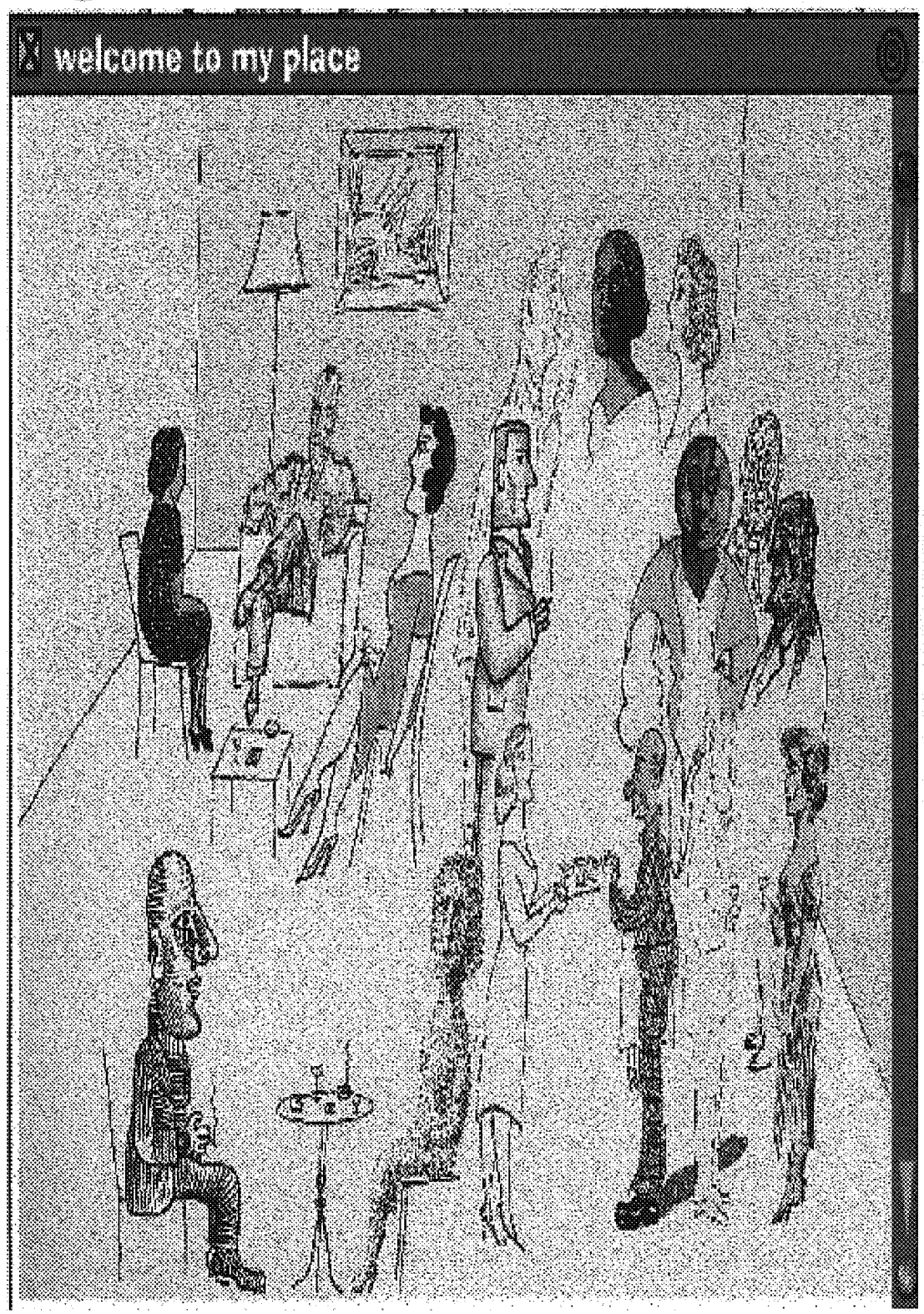
FIG. 7 is a sample screen shot showing the Consumer/User Private Wall.

Members, both private and public, can build, decorate and maintain their own Private Wall that serves as the member's electronic apartment where the member can invite friends and have parties and events. A sample screen shot showing a Private Wall is shown in FIG. 7. Optionally, members can earn their own Private Wall by receiving redeemable rewards through coupons, by participating with the Host Companies activities, or the like.

Figure 4:
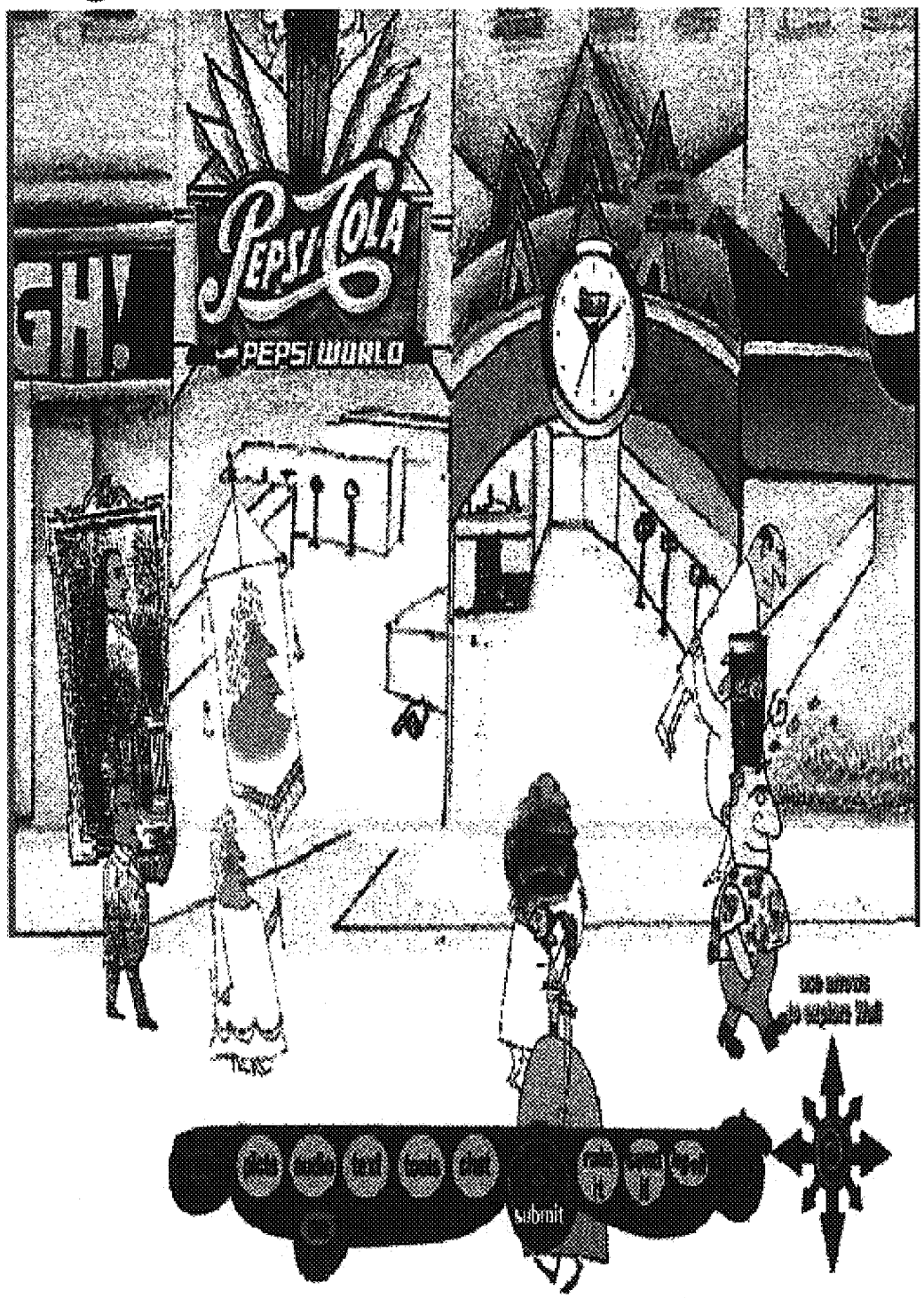
FIG. 4 is a sample screen shot showing a Sample Wall form which a consumer can use to contact a Wall™ sponsor.
Figure 8:
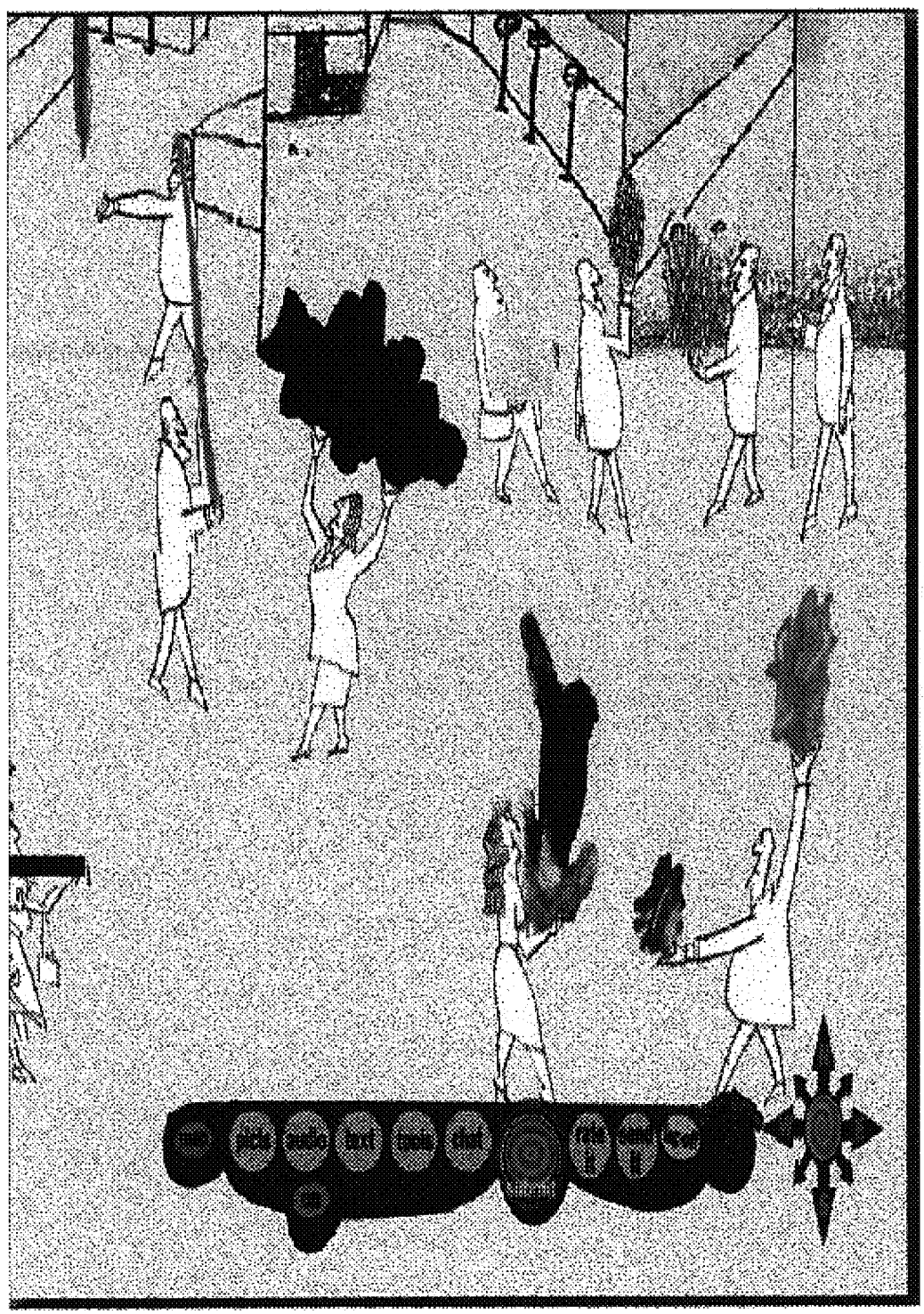
FIG. 8 is a sample screen shot showing the Graffiti Creation screen.

Members are seen on the Wall as animated electronic characters or avatars. For example, FIG. 4 shows a sample screen shot of the Main Wall 35 as having various avatars therein including a man carrying a picture, a lady carrying a poster, another lady carrying a hamburger, and the like. These member avatars can interact with other avatars via chat, Graffiti creation, games, focus groups, and other activities. FIG. 8 illustrates a sample screen shot showing the Graffiti Creation interaction tool selection.

The host company can allow its members to select various activities. Such activities may include: (i) allowing the member to construct their own avatar by providing multimedia elements by way of the Branded Avatar Construction Kit (##); and (ii) providing pre-designed avatars for the members to select and build upon. A sample screen shot showing the Avatar Graffiti Creation screen is illustrated in FIG. 9. In the case of building one's own avatar, one can upload visuals, animation and audio files. Branded items can be added to the Main Wall and to the private sub-walls. For example, on X's Candy's Wall one can add X's Candy branded clothes; on a member's private wall a member could decorate with branded items.

Alternatively, a Company member can provide pre-designed avatars for the members to select and build upon. In this embodiment, after logging in, users get a palette of avatars with pre-determined behavior, animation and audio affects. For example, one avatar's walking animation may consist of skipping, whereas another avatar's animation may consist of up and down leaps as they navigate throughout any given Wall.

Users can communicate with each other through various tools including: Post Office tools; Phoning A Friend tools; and textual Chat tools. Specifically, the Post Office tool allows one member to internally email other members. Whereas the Phoning A Friend tool allows one member to phone a friend/other member via audio tools including video cams and microphones. Members can chat with one another through use of the textual Chat tool, which can further include both visual and audio emotion tools. The Chat tool can provide members with a chat palette where users can type in text, select and position audio and visual emotions within the text box. Audio emotion tools include of words and sounds associated with various emotions, while visual emoticon tools include animations and possibly audio and text that are associated with various emotions. FIGS. 10 and 11 illustrate Chat screens depicting the use of the emotion tools in the communication of different avatars (i.e. different members throughout the given wall).

The text, audio and visuals are played out in the order they are placed within the text box. For example, if the words "hi bob" is first and then one places a cheering sound emoticon to its right, followed by an animation emoticon of lips smiling, the chat would play out in that order. One would first see "hi bob", followed by a cheering sound which is sequentially followed by the lip animation. The chat between members (company or consumer members) can be public or private. When members chat globally their text and sounds are in a visual talk balloon for all to see, while private chats are displayed only to the selected member(s).

Users can add graffiti to the Wall/environment. For example, a user/member can add city sounds and building bits as well as objects and props. Any Graffiti element can be branded, as branding is not restricted to branded items (see FIG. 11). Each Wall can have its own graffiti palettes so that a sub-Wall of a Party Room could be different from the Main Wall. Each could have its own multimedia to change the look, feel, voice and functionality. Graffiti includes any multimedia element (words, visuals, audio, and the like) and these multimedia elements can contain functionality. A plurality of tools is available for accomplishing avatars transportation throughout GraffitiWall®.

Figure 12:
FIG. 12 is a sample screen shot showing the Function Pieces screen.
Figure 13:
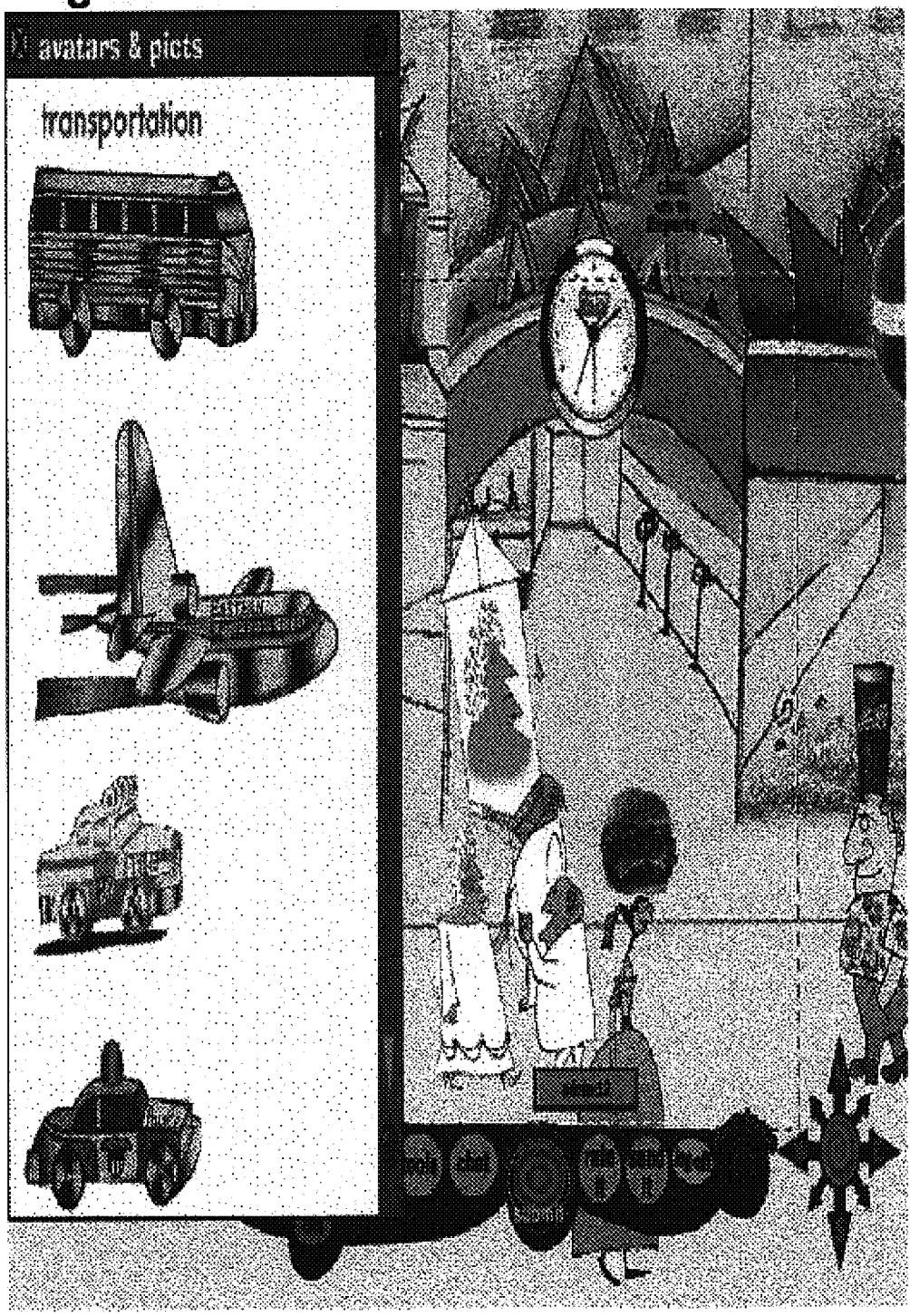
FIG. 13 is a sample screen shot showing the Select Transportation shot for use by the consumer.

In particularly these travel tools include: (ii) function pieces; and (ii) transportation pieces. The function pieces allow the member to select various tools, such as doorways to transport the avatar. The FIG. 12 screen shot illustrates these function pieces. For example, if one selects a door from the palette located on FIG. 12 (via "avatar & picts" window) and places it within the environment, the user can enter the selected doorway and be transported to another environment. Transportation pieces allow the member to be transported by various tools such as busses, planes, trains, or cars and the like, as is illustrated by way of the sample screen shot shown in FIG. 13. For example, if a member selects a bus from the FIG. 13 "avatars & picts" menu then the member/avatar rides inside and travels throughout the Wall.

Figure 14:
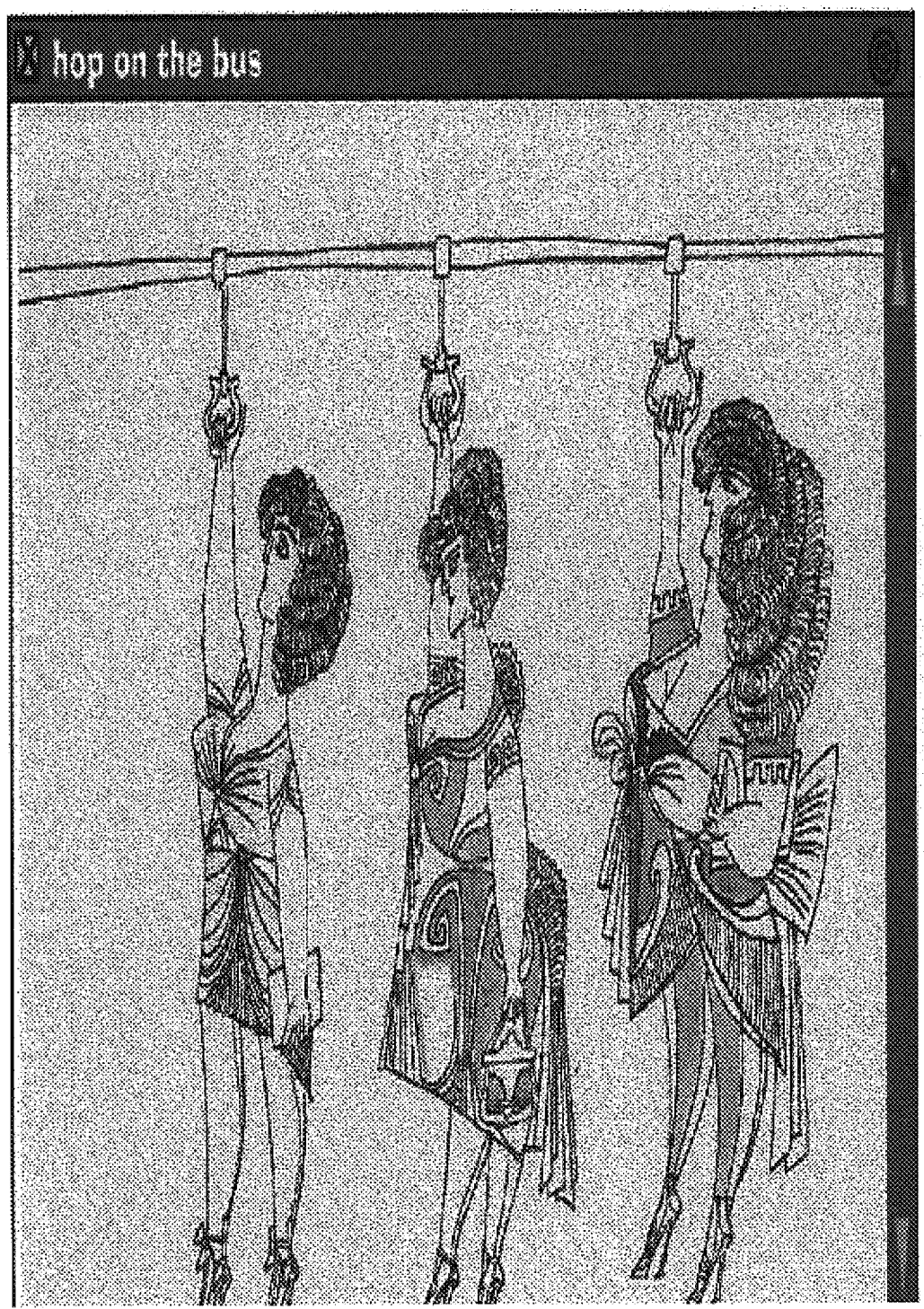
FIG. 14 is a sample screen shot showing the Transportation screen for use by the consumer.

Tool menus are also provided to allow the member to select various activities that the avatar acts out. For example, if the member selects a soda bottle the avatar can drink it. The avatar can also change color and shape either by way of the members own selection, or automatically (i.e. drinks a can of soda and can expand). In some cases, being transported to new areas allows members/avatars to interact with other members/avatars that have selected the same transportation tool. For example, if one member has selected a bus their avatar can interact and chat with other members/avatars who have also selected the bus/are on the bus as is illustrated by the example screen shot shown in FIG. 14.

Alternatively, a reward system may be utilized by company members to reward user/consumer members who interact and participate with the company member's brand. This interaction can include such things as participation in the company member's focus groups, surveys, being a good online citizen, frequency of visits to the company member's walls, or the like. Through the reward system can comprise various scaled levels, wherein the higher scaled levels provide greater reward incentives to the consumer member. The consumer member can advance to higher levels and thereby attain more rewards or points that are redeemable for branded and non-branded items. For example, the rewards could include awards within the GraffitWall, such as providing the consumer member with a private wall having an apartment, an avatar car, avatar clothes, a branded avatar watch, or the like.

The reward system scaled levels can be determined by way of a point system. On the Master Main Wall Admin there would be an added area where a member company can assign points to certain components or skins. On the Member side, their Admin Tools would contain a "catalog" showing the various items, their price and what their current point balance is.

Figure 15:
FIG. 15 is a sample screen shot of the Map screen.

Navigation tools are provided throughout the Graffiti-Wall®. These navigation tools comprise a compass arrow, a dynamic map (FIG. 15), hot spots throughout the walls, vehicles (FIG. 13), function pieces (FIG. 12), and various other menus. The dynamic map (sample screen shot shown in FIG. 15) maps out the entire Wall and includes all avatars, hotspots, and graffiti. The map is updated to reflect all changes and additions to the Wall. Clicking on a member's name could link the user to the appropriate GraffitiWall® and directly to the Wall location of the selected member.

Optionally, a company member can have a Wall Member List that can be posted on the member company's Wall, or/and dynamically posted on the member company's own website. The Wall Member List consists of a list of members logged onto the GraffitiWall®. Alternatively, consumer members can also view the Wall Member List. Clicking on one of the member names could link a member to the appropriate GraffitiWall®.

Administration or Communication Tools are the backbone of the GraffitiWall®. The Administration Tool Set is illustrated in the example screen shot shown in FIG. 16. Through these powerful and easy-to-use Administration Tools, sponsors/company members can continually change the Graffiti-Wall® environment, activities, feedback mechanisms, consumer targets, customer service responses, email campaigns and so on. The Administration Tools allow great flexibility to continually query the database. Customization is easy for sponsors to add and subtract features, assets and functionality. The engine is designed so one can wrap their multimedia assets and continually change and modify the look, feel and voice. The Administration Tools serve many communication needs and are easy to use.

An audio & visual studio and concert mode (collectively, the "studio") is provided by the Wall. The studio allows members to build a sequential multimedia environment. Members can layer and arrange a sequence of audio clips, animation, video and still images to later play back sequentially by the original creator or by other members. The studio includes two basic modes: (i) a studio mode; and (ii) a concert mode.

The studio mode allows a member to construct and deconstruct multimedia layers and sequences. The construction and deconstruction of the multimedia layers and sequences may be accomplished through a gridded timeline, wherein: time is represented horizontally and visual and auditory depth is represented vertically. Both horizontal and vertical layerings serve as timing timelines. Horizontal layering serves as the timing timeline and the vertical layering serves to make the top-most elements more prominent. For example, the top most layers of visual and auditory elements are more in the foreground than the back layers as per software programs such as Flash, Illustrator and Photoshop. Studio mode is completely editable so that the original composer, as well as other members, can modify the composition. Audio sequences are also provided as a series of self-contained audio streams that can be arranged in any order, like laying tracks down on a railroad track. These sequences will be played in order from left to right. If there are sequences on top of one another, the lower sequence shall play out via a more subdued tone.

Visual layering is also provided whereby the Wall's background serves as the overall visual background for layering video, animation and still images. For example, the background could be the interior of a three-ring circus tent. One can first lay down a video of a cheering crowd, with animated clowns juggling on top of the crowd. On the top-most layer is a close-up of a trapeze artist swinging from side to side. When the sequence plays, the crowd is seen in the background cheering; the clowns are juggling in the mid-ground; and the trapeze artist in the foreground is swinging from one side of the frame to the opposite side. Sequencing audio & visuals is also accomplished via layering, whereby visual and auditory elements are laid out horizontally on the track to control timing. For example, by making the clown and music track the same visual horizontal length, one ensures that they play simultaneously and stop at the same time. By clicking on the play button, the series of visual and auditory elements play out via the concert mode. After playing the sequence, any member can edit the studio by simply dragging, rearranging, adding and deleting, layering and sequencing elements.

Private Areas on the Wall are provided for either company members or consumer members. These areas are controlled, private areas that are controlled and maintained by the company member or consumer member. Company members can offer exclusive and private areas on the Wall for a variety of members and purposes. Some examples are: focus group sessions; and platinum club members. These private areas can be multi-tiered, whereby select members are afforded special access to different features including, but not limited to, at least one of the following: (i) communications and capabilities; (ii) loyal customer features; (iii) training; (iv) special events; (v) special parties; (vi) trade shows; (vii) test kitchens; and/or (viii) special promotions.

A company member can provide selected consumer members with private areas/walls while still providing a Main Town Square for all members to congregate. For example, XYZ Carpets, B B & B, or C and C could sponsor a community hub. This hub could have seminars, contests, special events, and promotions to encourage consumer members to congregate together. From these main town squares or via a direct URL, individual members can go to their private areas. Individuals can control their private Wall/community while still residing within a larger community sponsored by the Company member(s).

The company member can invite members to build their own residence. The background wall, audio, and visual elements are the company's brand equities. For example, XYZ Carpets offers a scrollable hip loft space complete with roof access and a great urban view. Members are offered Create Palettes populated with XYZ's rich colored and textured furniture, accessories, music etc to decorate their space. In addition, members are given some Admin Tools allowing them to upload their own visuals and audio, maintain chat and other forms of feedback. However, consumer members are not given the whole range of Admin Tools that are otherwise available to the company member. Administrative functions include general, member, wall-builder, picts, audio, tools, and survey functions. The wall-builder function provides predetermined components that members can select to assemble and rearrange the Wall. The wall-builder function also allows the member to select the size of the Wall.

Figure 17:
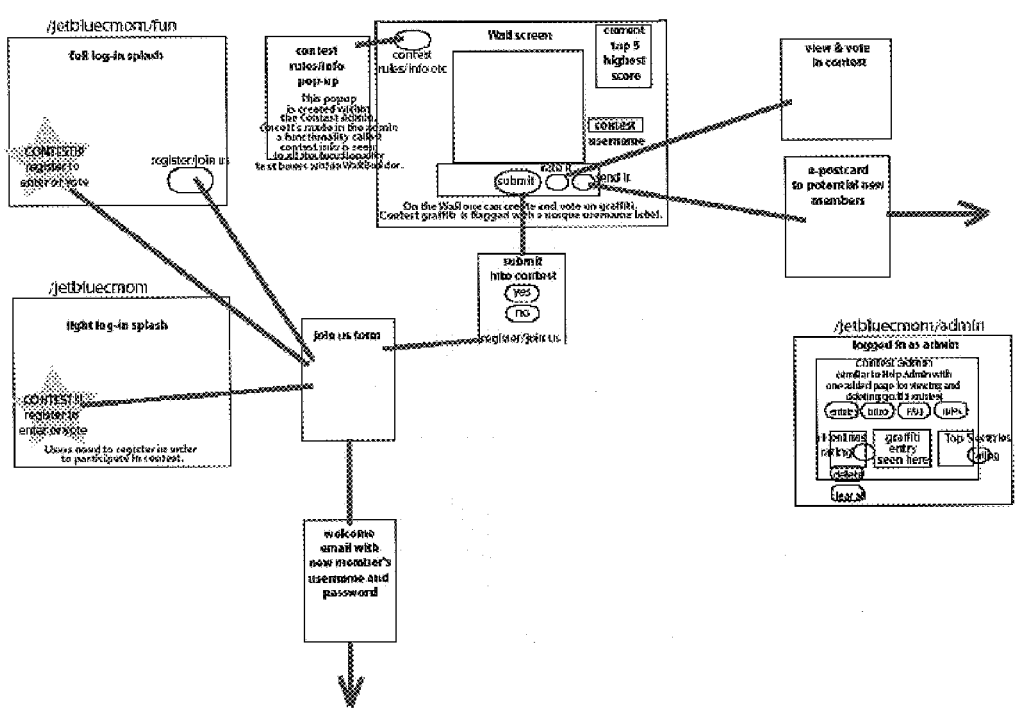
FIG. 17 is a flow diagram depicting the Contest operation of the present invention.

The present invention provides fun promotional events, activities, and contests that engage the audience. It also provides consumer information for company members. FIG. 17 illustrates the contest flow chart. For example, a contest may involve a competition wherein consumer members compete to be selected as the best in the creation of: a multimedia travel e-postcard; a story; a multimedia painting; a radio commercial; and so on.

Figure 18:
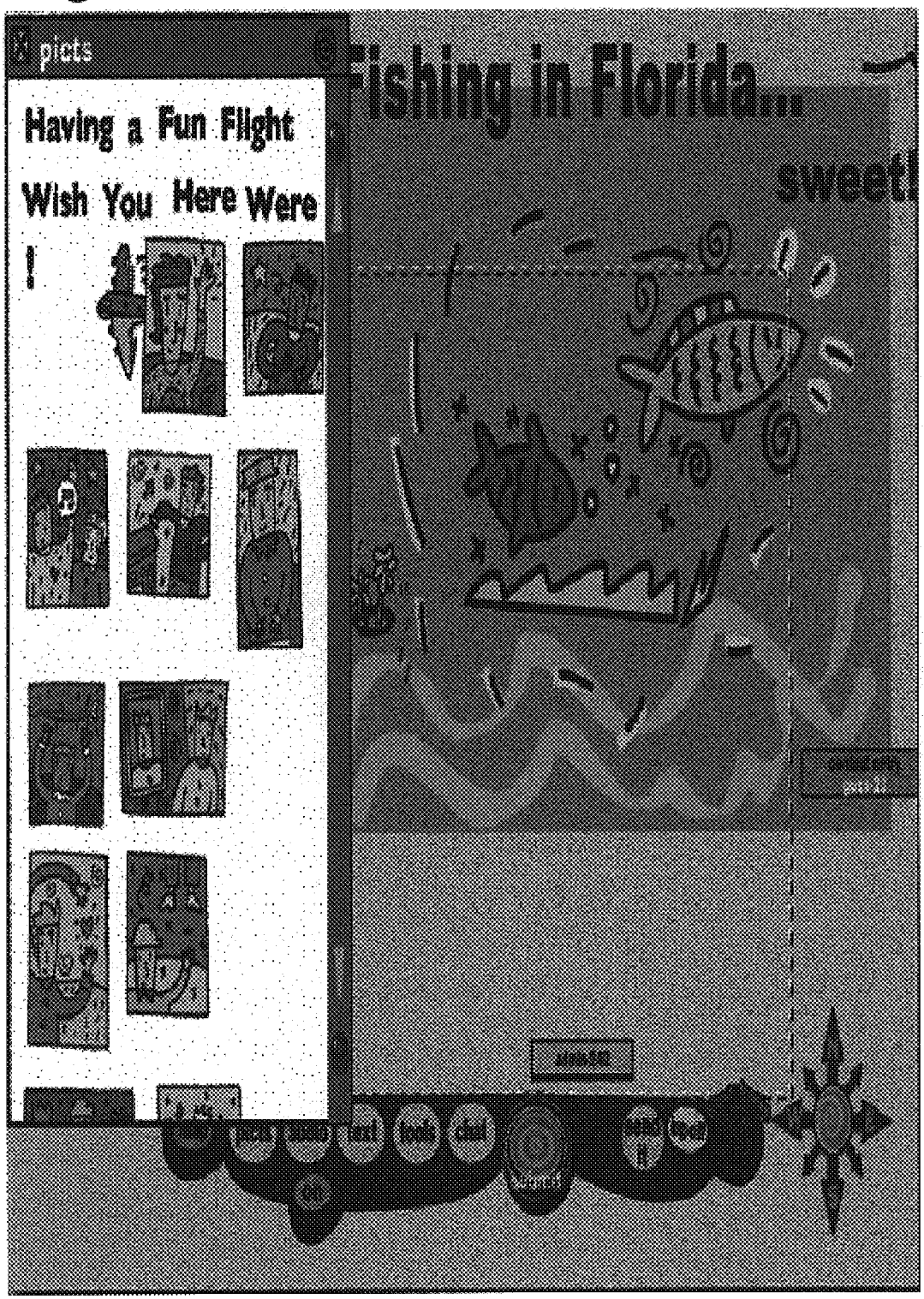
FIG. 18 is a sample screen shot showing the Contest Picts screen.
Figure 19:
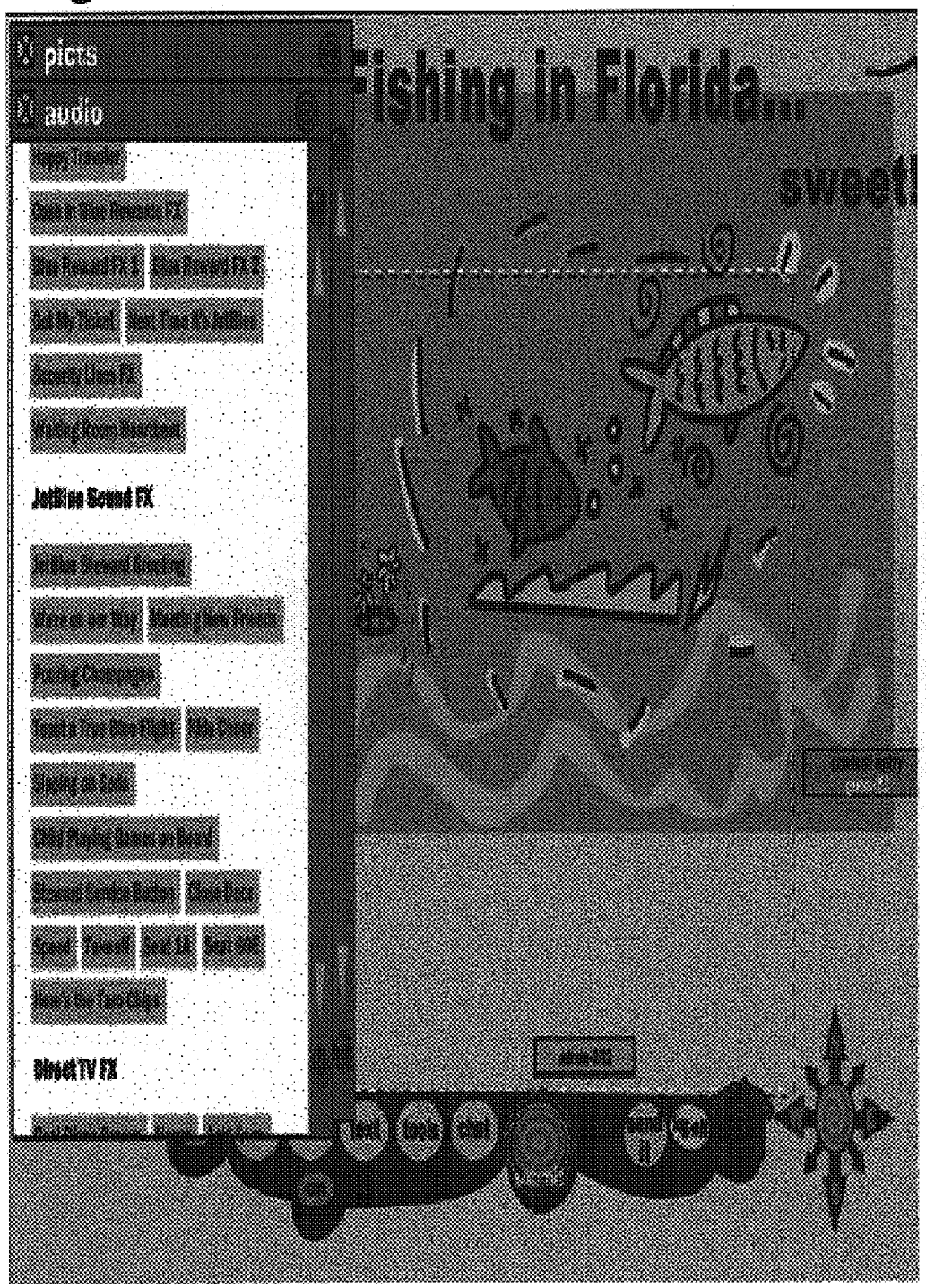
FIG. 19 is a sample screen shot showing the Contest Audio screen.

These contests can provide word-of-mouth marketing, brand messaging and the ability to collect consumer information. In one embodiment, the contest is to create a Travel Postcard of a consumer member's favorite Company Z service or good. The members can use sounds, words and images, representing Company Z's services or goods via Graffiti Wall's picts (see example screen shot in FIG. 18), and text and audio palettes (see example screen shot in FIG. 19). Winners are the highest scoring postcards ranked by Company Z's member Wall community via dynamic tally of the contestant's entries.

Figure 20:
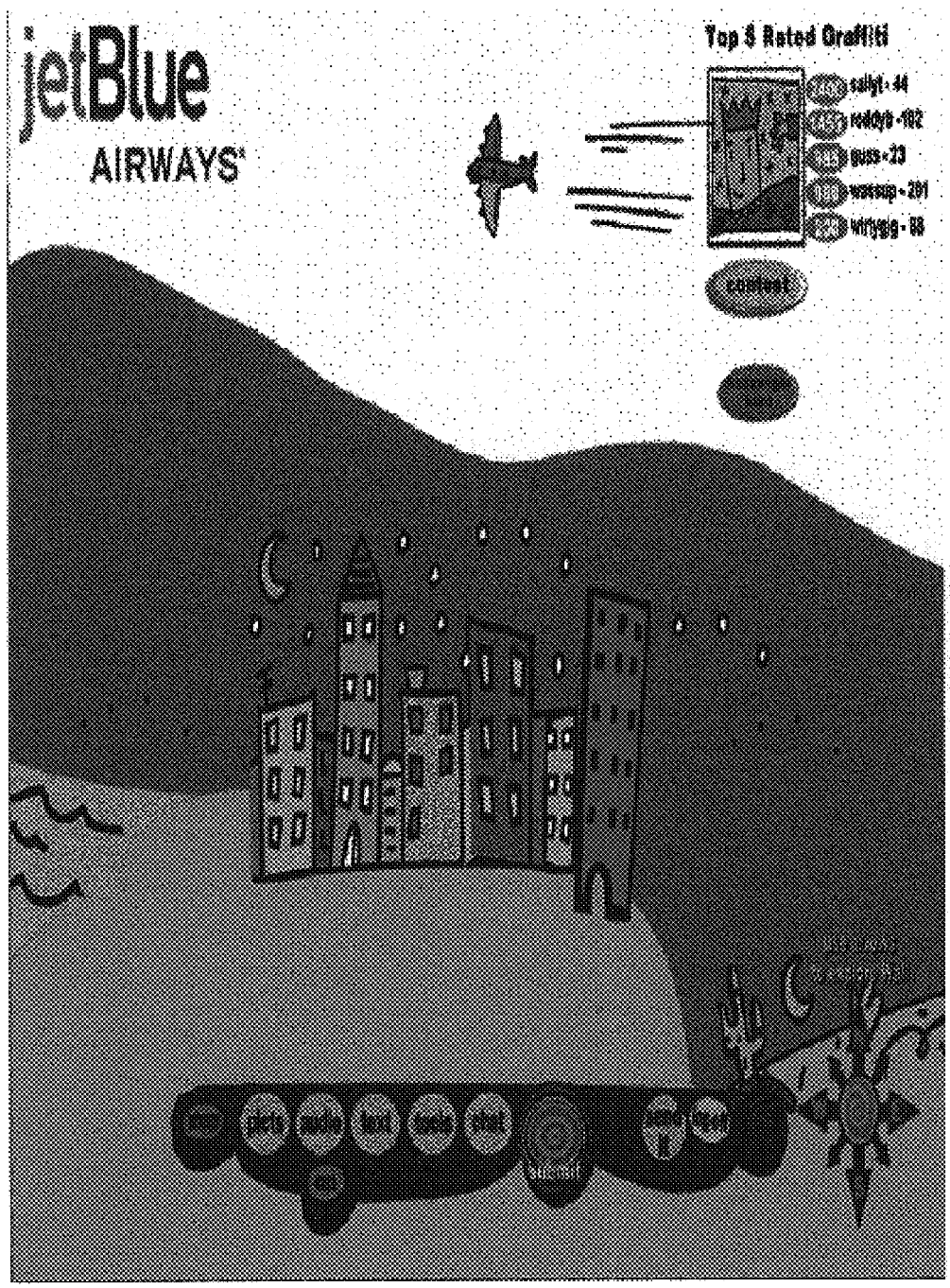
FIG. 20 is a sample screen shot showing the Contest Dynamic Top screen.
Figure 21:
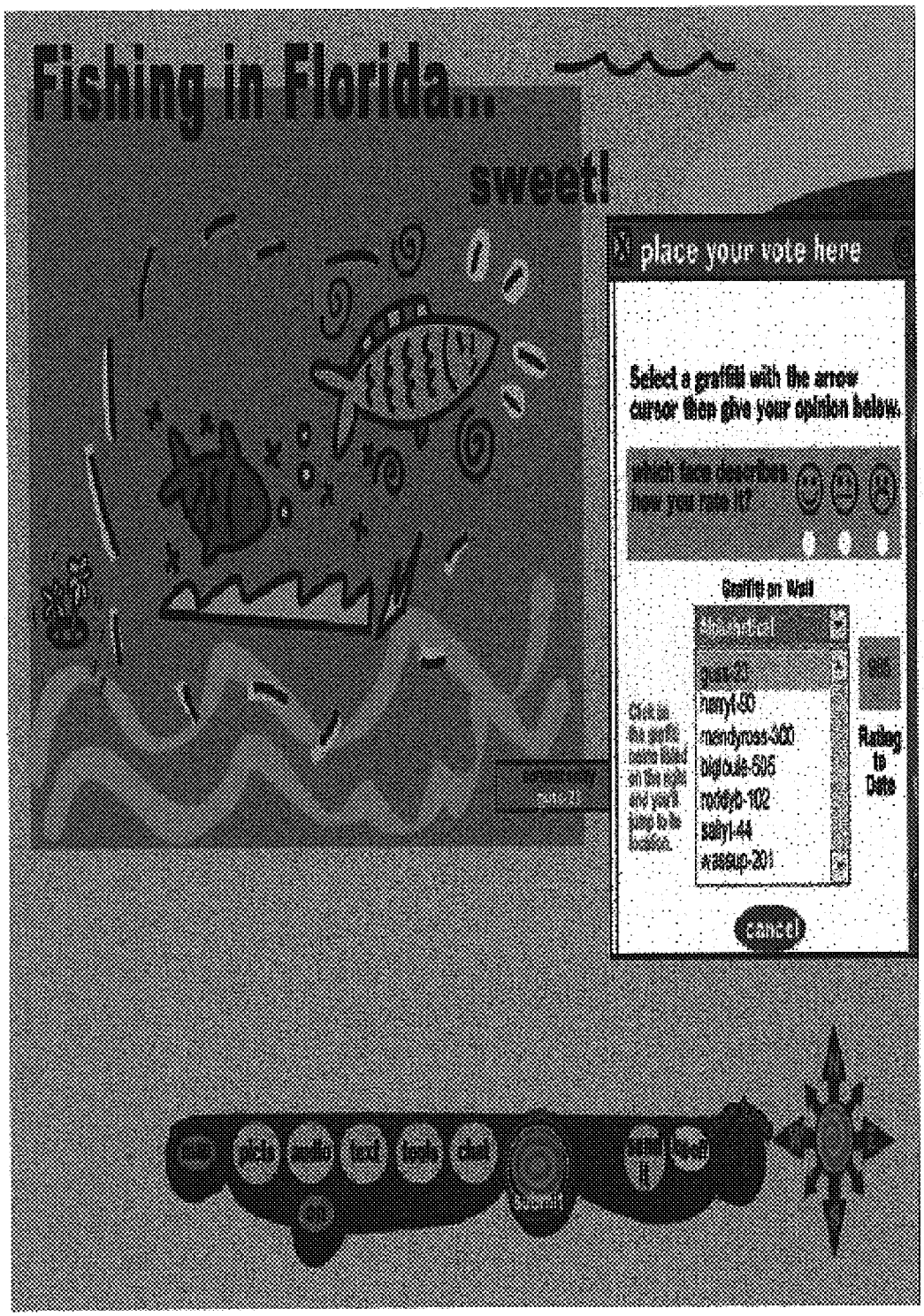
FIG. 21 is a sample screen shot showing the Contest Voting screen.

For example, FIG. 20 illustrates a screen shot showing the tallying of the top 5 postcard entries, which is continuously tallied (see example screen shot in FIG. 20). Clicking on one of the posted names transports the user to the selected postcard entry on the Wall, allowing the member user to vote on the selected entry (see example screen shot in FIG. 21). The member can enter the contest via creating their own multimedia travel postcard.

A company member could provide that the consumer member must register with the company member's wall in order to participate in the contest. Registration would consist of filling out a simple form containing questions useful to the company member. For example, Company Z may inquire things such as: what are their favorite Company Z destinations, how often do they travel, how often on Company Z, and the like.

Figure 22:
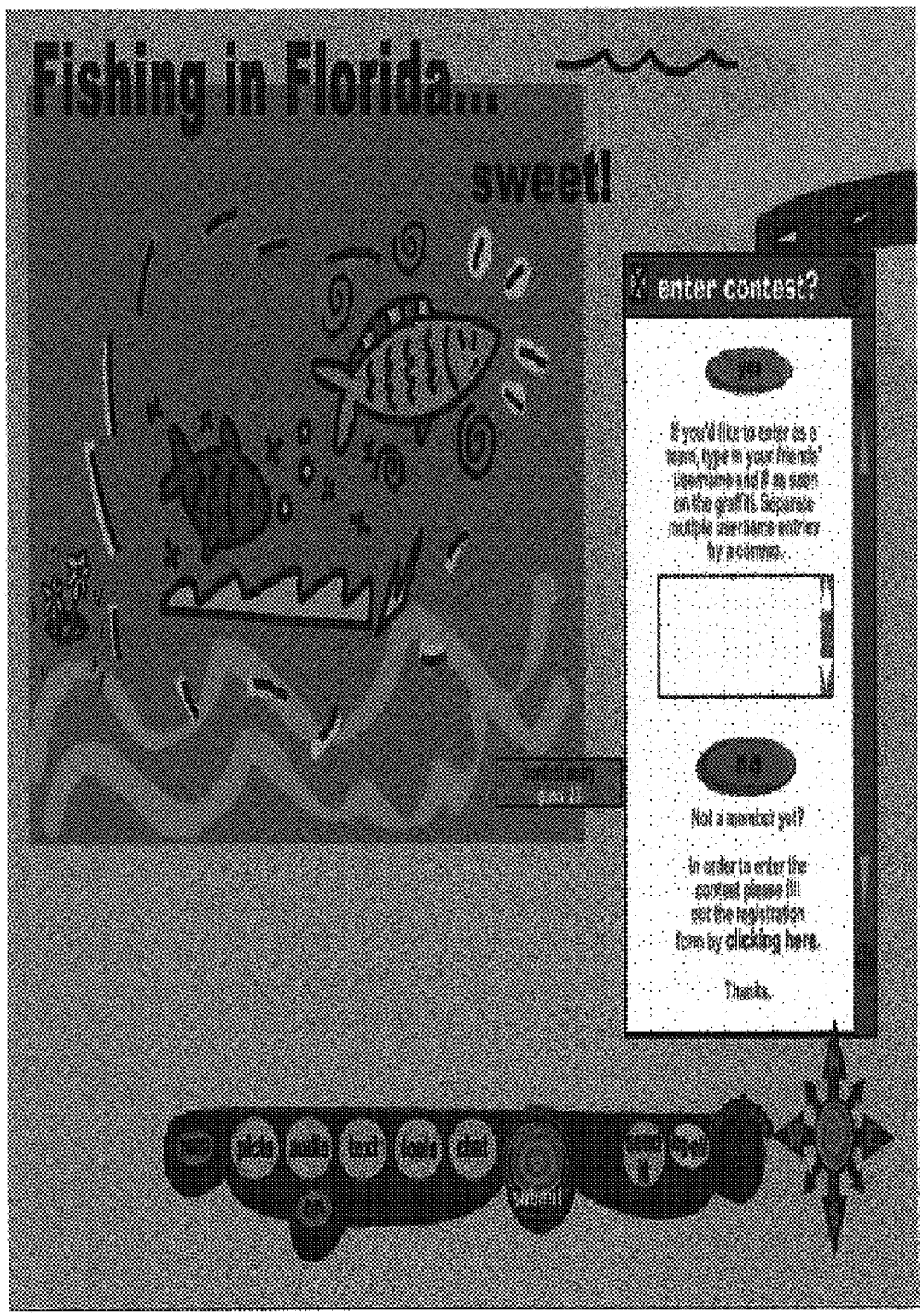
FIG. 22 is a sample screen shot showing the Contest Submit screen.

Members could create their own postcards, collaborate with other Members (see example screen shot in FIG. 22) and then invite their friends to join up so they could help their rating. This serves as a viral mechanism to extend the Company Z brand. Optionally, only registered members can have voting rights to rate the postcards, encouraging more member signups. Optionally, the top 5 winners receive a prize determined by Company Z, such as a vacation for two to NYC or two round trip tickets to another favorite Company Z destination.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A networked interactive system for display of product information to a plurality of consumers, comprising:
   a. a multimedia forum for enabling said consumers to communicate in a plurality of modes with at least one sponsor associated with a brand that is related to said product information;
   b. a multimedia interface for enabling said consumers to modify and view said product information through use of a plurality of graphic tools; and
   c. said multimedia forum is created by said sponsor and includes:
      i. at least one public main wall frame window created by said sponsor for displaying said product information related to said sponsor;
      ii. at least one public sub-wall frame window created by either said sponsor or said consumers via said multimedia interface, said public sub-wall being located within said public main wall frame window and displaying said product information via a scrollable sub-wall window; and
      iii. at least one private sub-wall frame window located within said public main wall frame window, said private sub-wall being created by said consumer via said multimedia interface;
   wherein said consumers modify said product information using graphic tools, and said product information and said multimedia interface are updated based upon said consumers' modifications and communicated to said sponsor; and
   wherein said multimedia interface enables said sponsor and said consumers to access said public main wall and said public sub-wall and to modify and view said public main wall and said public sub-wall, and
   wherein said private sub-wall is only accessed, viewed and modified by a specific consumer that created said private sub-wall.

2. A system as recited by claim 1, wherein said product information is associated with a brand message, a brand identity, or a brand characteristic that links said brand with a good or service provided by said sponsor.

3. A system as recited by claim 1, wherein said product information is associated with a brand message, a brand identity, or a brand characteristic that links said brand with a good or service.

4. A system as recited by claim 1, wherein said product information is arranged in a multimedia element.

5. A system as recited by claim 1, further comprising an avatar kit having an array of avatar multimedia elements comprising an avatar body pallet, an avatar hair style palette, and an avatar facial expression pallet, wherein said sponsor creates customized branded avatars that act as interactive buddies having predetermined personalities.

6. A system as recited by claim 5, wherein said avatar kit has an array of avatar multimedia elements comprising an avatar body pallet, an avatar clothing pallet, an avatar hair style palette, an avatar facial expression pallet, a personality pallet, and an audio pallet.

7. A system as recited by claim 6, wherein said avatar body pallet comprises a plurality of body types, hair styles, heads, facial structures, faces, limbs, and personalities components, wherein said sponsor creates customized branded avatars that act as interactive buddies having predetermined personalities.

8. A system as recited by claim 6, wherein said avatar kit is adapted for use by said sponsor in creating an avatar that is associated with said brand to form a branded avatar, wherein said avatar kit is adapted for use by said consumer in creating an avatar to form a consumer avatar.

9. A system as recited by claim 6, wherein said branded avatars are adapted to be used as a conduit for communication between said sponsor and said consumer.

10. A system as recited by claim 6, wherein said branded avatars are adapted to be used as a conduit for communication between said sponsor and said consumer, wherein said conduits of communication comprise at least one online DJ.

11. A system as recited by claim 6, wherein said branded avatars are adapted to be used as a conduit for communication between said sponsor and said consumer, wherein said conduits of communication comprise at least one company branded character icon.

12. A system as recited by claim 5, wherein said avatar kit is adapted for use by said sponsor in creating an avatar that is associated with said brand to form a branded avatar, wherein said avatar kit provides predetermined avatars that have predetermined personalities and interact with said branded avatars from which said consumer chooses from to form a consumer avatar.

13. A system as recited by claim 5, wherein said sponsor creates an avatar associated with said product information of said brand to form a branded avatar, wherein said branded avatar is selected by said consumer and interacts with a plurality of avatars throughout said system.

14. A system as recited by claim 5, wherein said branded avatars are adapted to be used as a conduit for communication between said sponsor and said consumer, wherein said conduits of communication comprise at least one customer service representative.

15. A system as recited by claim 5, wherein said branded avatars are adapted to be used as a conduit for communication between said sponsor and said consumer, wherein said conduits of communication comprise at least one promotional product launch service.

16. A system as recited by claim 1, wherein an avatar construction kit is provided by said sponsor comprising multimedia elements.

17. A system as recited by claim 16, wherein said multimedia elements comprise a body type palette, hair styles, facial expressions, clothing, musical backgrounds, personalities, and sound bytes.

18. A system as recited by claim 1, wherein said sponsor customizes a brand environment, wherein said brand environment provides a brand forum wherein said sponsor and said consumer chat and interact with each other.

19. A system as recited by claim 1, wherein said consumer customizes a brand environment, and said brand environment provides a brand forum wherein said sponsor and said consumer chat and interact with each other.

20. A system as recited by claim 1, wherein said sponsor creates at least one avatar and said consumer create at least one avatar, wherein said sponsor avatar and said consumer avatar chat and interact with each other.

21. A system as recited by claim 1, wherein said multimedia forum is created by said sponsor and wherein said multimedia interface comprising said system enables said sponsor and said consumer to access said public main wall and said public sub-wall and to modify and view said public main wall and said public sub-wall.

22. A system as recited by claim 1, wherein said sponsor creates at least one branded avatar and said consumers creates consumer avatars, said avatars being seen on said public main wall, public sub-wall, and private sub-wall as animated electronic characters that interact and communicate with each other and said public main wall, public sub-wall and private sub-wall environments.

23. A system as recited by claim 1, wherein said consumers and said sponsor communicate with each other through a post office communication interface.

24. A system as recited by claim 1, wherein said consumers and said sponsor communicate with each other through a phone a friend communication interface providing the use of video cameras and microphones.

25. A system as recited by claim 1, wherein said consumers and said sponsor communicate with each other through a chat communication interface, wherein said chat comprises textual, visual, and audio emoticons to reflect a plurality of emotions.

26. A system as recited by claim 1, wherein said consumers and said sponsor create their own avatars, wherein said avatars communicate with each other through an avatar chat communication interface comprising textual, visual, and audio emoticons to reflect a plurality of emotions.

27. A system as recited by claim 26, wherein said avatar chat communication interface comprises a private chat between said consumer avatars.

28. A system as recited by claim 1, wherein said consumers and said sponsor create their own avatars, and said avatars select a plurality of function multimedia elements adapted to interact with said avatars via said multimedia interface of said system.

29. A system as recited by claim 1, wherein said sponsor has a reward system, and said reward system is adapted for rewarding said consumers.

30. A system as recited by claim 29, wherein said reward system consists of a plurality of scaled levels, said scaled levels reflect a point system and said consumers are awarded points for participating with said sponsor, and said points are redeemable for branded and non-branded goods and services.

31. A system as recited by claim 1, wherein said multimedia interface comprises a navigation interface having a compass arrow, a dynamic map, a plurality of sub-walls throughout said multimedia forum, a plurality of transportation means, and a plurality of menus.

32. A system as recited by claim 31, wherein said plurality of transportation means comprises taxis, planes, cars, wheel chairs, scooters, skateboards, and other like modes of transportation.

33. A system as recited by claim 31, wherein said dynamic map is adapted to be updated in real time in accordance with said consumer and said sponsor modifications.

34. A system as recited by claim 1, wherein said sponsor has a consumer member posting that lists logged-on consumers and the location of said logged-on consumers and interfacing means, for communicating with said logged-on consumers.

35. A system as recited by claim 1, further comprising an administration or communication tool set adapted to enable said sponsor to continually modify said system.

36. A system as recited by claim 1, further comprising an administration or communication tool set adapted to enable said consumer to continually modify a private sub-wall of said system.

37. A system as recited by claim 1, wherein said consumers build a sequential multimedia environment, wherein said sequential multimedia environment is comprised of a studio mode and a concert mode.

38. A system as recited by claim 37, wherein said studio mode comprises means for creating a multimedia layer sequence via a gridded timeline wherein time is represented horizontally and visual and auditory depth is represented vertically.

39. A system as recited by claim 37, wherein said concert mode comprises means for playing said multimedia layer sequence.

40. A system as recited by claim 1, wherein said sponsor provides a wall contest, wherein said wall contest engages consumers and provides consumer information to said sponsor.

41. A system as recited by claim 40, wherein said wall contest comprises creating multi-media postcards, story writing, multimedia painting, a best radio commercial, or finding answers to a scavenger hunt.

42. A system as recited by claim 40, comprising means for continuously tallying votes for said wall contest entries.

43. A system as recited by claim 1, wherein said consumers communicate via a focus group.

44. A system as recited by claim 43, wherein said focus group interaction is real time and led by a moderator.

45. A system as recited by claim 43, wherein said focus group interaction comprises question and answer sessions.

46. A system as recited by claim 1, wherein said product information comprises images stored as vector graphics.

47. A system as recited by claim 1, wherein said consumer interacts with said system via a Web browser.

48. A system as recited by claim 1, wherein said product information is encoded in an active server page (ASP).

49. A system as recited by claim 1, wherein said multimedia interface is customized by a system administrator to reflect each said consumer's interests.

50. A system as recited by claim 49, wherein consumer interaction with the multimedia forum is distributed among a plurality of product information servers.

51. A system as recited by claim 1, wherein said system comprises at least one database server connected to at least one product information server, wherein said product information server is further connected to at least one client workstation.

52. A system as recited by claim 1, wherein said consumer adds multimedia product information to the system.

53. A system as recited by claim 52, wherein said consumer's modification to the product information is stored as a series of instructions.

54. A system as recited by claim 52, wherein said system administrator controls:
  a. a length and width of the multimedia interface presented to the consumer;
  b. a length of time the consumer modifications persist;
  c. consumer access to the system;
  d. promotions and prizes distributed through the multimedia forum;
  e. a schedule of focus groups, interviews, and chats enabled through the multimedia interface;
  f. a mailing list of consumers accessing the system; and
  g. consumer assistance.

55. A system as recited by claim 1, wherein said system is customized to reflect interests of a group of said consumers.

56. A system as recited by claim 1, wherein said private sub-wall frame window is accessed by way of said public main wall frame window, said public sub-wall frame window, or a unique URL.

57. A system for displaying product information to a plurality of consumers in a networked interactive system, comprising:
  a. means for connecting said consumer with at least one sponsor associated with a brand that is related to product information concerning a brand so that they communicate with each other in a multimedia forum created by said sponsor including:
    i. at least one public main wall frame window created by said sponsor for displaying said product information related to said sponsor;
    ii. at least one public sub-wall frame window created by either said sponsor or said consumers via said multimedia interface, said public sub-wall being located within said public main wall frame window and displaying said product information via a scrollable sub-wall window; and
    iii. at least one private sub-wall frame window located within said public main wall frame window, said private sub-wall being created by said consumer via said multimedia interface;
  b. means for providing a multimedia interface to said consumer with which said consumer modifies and views said product information;
  c. means for updating said product information and said multimedia interface based upon said consumer modification;
  d. means for communicating said updating to said sponsor; wherein said product information is updated based upon said consumer modification and communicated to said sponsor; and
  wherein said multimedia interface enables said sponsor and said consumer to access said public main wall and said public sub-wall and to modify and view said public main wall and said public sub-wall, and wherein said private sub-wall is only accessed, viewed and modified by a specific consumer that created said private sub-wall.

* * * * *